US012466012B2

(12) United States Patent
Widmer et al.

(10) Patent No.: US 12,466,012 B2
(45) Date of Patent: Nov. 11, 2025

(54) BASE UNIT FOR RELEASABLY FIXING WORKPIECE SUPPORTS

(71) Applicant: Andreas Maier GmbH & Co. KG, Fellbach (DE)

(72) Inventors: Karl Widmer, Stuttgart (DE); Christian Derrez, Winnenden (DE)

(73) Assignee: Andreas Maier GmbH & Co. KG, Fellbach (DE)

( * ) Notice: Subject to any disclaimer, the term of this patent is extended or adjusted under 35 U.S.C. 154(b) by 344 days.

(21) Appl. No.: 18/077,986

(22) Filed: Dec. 8, 2022

(65) Prior Publication Data

US 2023/0182245 A1 Jun. 15, 2023

(30) Foreign Application Priority Data

Dec. 10, 2021 (DE) ...................... 10 2021 132 668.0

(51) Int. Cl.
*B23Q 1/25* (2006.01)
(52) U.S. Cl.
CPC ...................... *B23Q 1/25* (2013.01)
(58) Field of Classification Search
CPC .. B23P 1/0063–1/009; B23P 1/25; B23P 3/10; B23P 3/102; B23P 3/103; B22F 12/30
See application file for complete search history.

(56) References Cited

U.S. PATENT DOCUMENTS 4,502,656 A 3/1985 Zeitler
5,308,050 A 5/1994 Schröder
(Continued)

FOREIGN PATENT DOCUMENTS

DE 4139522 C1 12/1992
DE 10 2020 105 722 9/2021
(Continued)

OTHER PUBLICATIONS

European Patent Office, "Extended European Search Report," issued in connection with European Patent Application No. 22211452.2, dated Apr. 5, 2023, 16 pages, with English translation.
(Continued)

*Primary Examiner* — Christopher J. Besler
(74) *Attorney, Agent, or Firm* — Hanley, Flight & Zimmerman, LLC

(57) ABSTRACT

In order to create a base unit for releasably fixing workpiece supports, which each comprise at least one clamping bolt, that makes it possible to quickly and reliably create a workpiece support structure from a plurality of workpiece supports on the top side of the base unit, said workpiece support structure having a total workpiece support face of a desired shape and size, it is proposed that the base unit comprises the following:
a base plate,
a cover plate, which is provided with cover plate through-openings through each of which a clamping bolt of a workpiece support can pass,
a fixing element, which is provided with fixing element through-openings through each of which a clamping bolt of a workpiece support can pass, and by means of which at least one clamping bolt of a workpiece support is fixable to the base unit when the fixing element is located in a working position, and
a movement device for moving the fixing element from a rest position into the working position and/or from the working position into the rest position.

16 Claims, 23 Drawing Sheets

(56) References Cited

U.S. PATENT DOCUMENTS

| | | | |
|---|---|---|---|
| 5,415,384 A * | 5/1995 | Obrist | B23Q 7/1426 |
| | | | 409/219 |
| 2004/0256780 A1 | 12/2004 | Lang | |
| 2020/0189051 A1 | 6/2020 | Taylor et al. | |

FOREIGN PATENT DOCUMENTS

| | | |
|---|---|---|
| EP | 1044760 | 6/2004 |
| EP | 2613902 B1 | 5/2016 |
| WO | 2012033803 | 3/2012 |

OTHER PUBLICATIONS

German Patent Office, "Search Report," issued in connection with German Patent Application No. 10 2021 132 668.0, mailed on Aug. 24, 2022, 21 pages, with English translation.

* cited by examiner

BASE UNIT FOR RELEASABLY FIXING WORKPIECE SUPPORTS

RELATED APPLICATION

The present disclosure relates to the subject matter disclosed in German application number 10 2021 132 668.0 of 10 Dec. 2021, which is incorporated herein by reference in its entirety and for all purposes.

FIELD OF THE DISCLOSURE

The present invention relates to a base unit for releasably fixing workpiece supports, which each comprise at least one clamping bolt.

Such workpiece supports are, in particular, provided for use in 3D printing processes, wherein the workpiece to be printed are then formed on the top side of a respective workpiece support that faces away from the base unit.

In so-called hybrid processes, such a workpiece support may already comprise part of a workpiece that has been produced in another manufacturing process.

SUMMARY OF THE INVENTION

In accordance with an embodiment of the invention, a base unit is created for releasably fixing workpiece supports, which each comprise at least one clamping bolt, that makes it possible to quickly and reliably create a workpiece support structure from a plurality of workpiece supports on the top side of the base unit, said workpiece support structure having a total workpiece support face of a desired shape and size.

In accordance with an embodiment of the invention, provision is made that the base unit comprises the following:
- a base plate,
- a cover plate, which is provided with cover plate through-openings through each of which a clamping bolt of a workpiece support can pass,
- a fixing element, which is provided with fixing element through-openings through each of which a clamping bolt of a workpiece support can pass, and by means of which at least one clamping bolt of a workpiece support is fixable to the base unit when the fixing element is located in a working position, and
- a movement device for moving the fixing element from a rest position into the working position and/or from the working position into the rest position.

The present invention makes it possible to simultaneously lock a plurality of workpiece supports, which are arranged on the top side of the cover plate of the base unit, to the base unit or to simultaneously unlock them from the base unit in a simple, quick, and reliable manner.

The base unit in accordance with the invention is suitable for use in all applications in which a workpiece must be fixed in its position with moderate holding forces, for example in a measuring machine, in a grinding machine, or in a milling machine.

Furthermore, the base unit in accordance with the invention is suited, in particular, for use in a 3D printing process for the additive manufacturing of a workpiece.

Here, in particular, it may be a metal 3D printing process.

The plurality of workpiece supports, which may be arranged on the top side of the cover plate of the base unit, can preferably be removed individually from the cover plate and be reused in a machining process following the 3D printing process.

The plurality of workpiece supports may also have been used before fixing to the base unit in preceding machining processes.

The invention described here is also suitable for being able to produce hybrid workpieces with high positional accuracy. Both conventionally manufactured base bodies (by milling, turning etc.), which are built further in a subsequent process by 3D printing, and components that are built on the support plate (the workpiece support) only in the 3D printing process, which are subsequently manufactured further by deposition welding, can be clampingly mounted.

The cover plate through-openings of the cover plate of the base unit are preferably configured as fitting bores, which are configured exactly complementary to a centering collar of a clamping bolt of a workpiece support, such that as a result of the cooperation of the clamping bolt and the respective cover plate through-opening, the respective workpiece support is precisely positionable and exactly orientable on the base unit.

The combination of a base unit and a plurality of workpiece supports arranged on the base unit has the positional accuracy of a zero-point clamping system.

When the combination of the base unit and a plurality of workpiece supports arranged thereon is integrated into a software for positioning workpiece supports and/or workpieces in a 3D printer, the zero-point (spatial reference point) of the 3D printing process can be transferred to further machining processes that follow the 3D printing process.

The cover plate and the base plate of the base unit together form a housing of the base unit, which preferably has a low installation height. The height of the housing may be, for example, at most 30 mm, in particular at most 20 mm, particularly preferably at most 15 mm.

The workpiece supports each comprising at least one clamping bolt can be held with sufficient holding forces on a workpiece support mount of a machining apparatus in machining processes following the 3D printing process.

By simultaneously fixing all clamping bolts of all workpiece supports, which are arranged on the top side of the cover plate of the base unit, there are enormous time savings at the beginning and end of the 3D printing process.

In order to be suited for a metal 3D printing process, provision is preferably made that the base unit is made of materials that can withstand a high temperature load of at least 400° C., in particular at least 500° C., particularly preferably at least 650° C.

The base unit in accordance with the invention is very easy to clean and has a very high repeatability for the positioning of the workpiece supports on the top side of the cover plate of the base unit.

The workpiece supports are held on the base unit with a high holding force by way of their clamping bolts when the fixing element is located in the working position.

On the individual workpiece supports, which can also be referred to as segments, workpieces can be formed with a positional accuracy of 0.05 mm or better in a metal 3D printer.

The workpiece supports may be arranged in any combinations and positions on the top side of the cover plate of the base unit as long as the clamping bolts are able to each engage into one of the cover plate through-openings.

Workpiece supports that comprise only one single clamping bolt may comprise an anti-rotation element in addition to the clamping bolt in order to be able to fix the respective workpiece support in a rotationally fixed manner on the top side of the cover plate of the base unit.

Due to the sufficiently strong connection of the additively manufactured workpieces to the workpiece support, no additional clamping of the additively manufactured workpieces in machining processes following the 3D printing process is necessary.

A workpiece support provided with a clamping bolt together with the workpiece additively manufactured on the workpiece support can be clamped with an accuracy of 0.005 mm or better in machining processes following the 3D printing process by means of the clamping bolt.

In a preferred embodiment of the invention, provision is made that the fixing element through-openings each comprise a chamfer or each comprise a rim region with a smaller radius of curvature and a rim region with a greater radius of curvature.

In the rest position of the fixing element, the clamping bolts of the workpiece supports preferably each pass through a portion of a respectively associated fixing element through-opening that is bounded by the rim region with the greater radius of curvature.

In the working position of the fixing element, the clamping bolts of the workpiece supports preferably each pass through a portion of the respectively associated fixing element through-opening that is bounded by the rim region with the smaller radius of curvature.

The fixing element may be configured, e.g., as a fixing plate.

The fixing element preferably comprises resiliently held clamping frames on each of which at least one fixing element through-opening is arranged.

Each clamping frame is preferably held on a basic body of the fixing element by means of one or more resiliently elastic arms.

The midpoints of the cover plate through-openings are preferably arranged at the grid points of a regular grid.

Here, for example, it may be a rectangular grid, a square grid, or a hexagonal grid.

It is particularly favorable for a precise positioning and orientation of the workpiece supports on the base unit if a clamping bolt of a workpiece support is centerable by means of each of the cover plate through-openings when the clamping bolt extends through the respective cover plate through-opening.

The clamping bolt of a workpiece support is preferably centerable with little play by means of the cover plate through-openings when the clamping bolt extends through the respective cover plate through-opening.

The movement device of the base unit preferably comprises a mechanical, pneumatic, hydraulic, or electric drive for the movement of the fixing element from the rest position into the working position and/or from the working position into the rest position.

For example, provision may be made that the movement device comprises a screw with a head that is stationarily mounted in the axial direction of the screw relative to the cover plate and/or relative to the base plate of the base unit.

The mounting of the head of the screw on the cover plate and/or on the base plate of the base unit may be effected, e.g., by means of one or more bearing discs and/or by means of a securing ring.

Furthermore, provision may be made that the movement device comprises a driver, which is coupled to the fixing element and is in engagement with a drive element of the movement device.

For example, provision may be made that the driver is coupled to the fixing element by screwing.

Furthermore, provision may be made that the driver comprises a thread, which is preferably in engagement with a complementary thread of the screw.

The thread of the driver is preferably configured as an internal thread.

In a preferred embodiment of the invention, provision is further made that the base unit comprises an elastically deformable pressing element for pressing the fixing element against the cover plate.

Such a pressing element may be configured, e.g., as a pressing mat.

The pressing element may comprise, for example, fibers, preferably glass fibers and/or ceramic fibers.

For improving the sliding properties of the driver and/or of the fixing element, the pressing element may be made of graphite and/or comprise a coating of a friction-reducing material, for example a polytetrafluoroethylene (PTFE) material.

The base plate of the base unit may comprise recesses or base plate through-openings for each accommodating a clamping bolt of a workpiece support.

In order to be able to releasably fix the base unit to a supporting base or to a clamping device in a simple manner, it is advantageous if the base unit comprises at least one clamping bolt for releasably fixing the base unit to a supporting base or to a clamping device.

The base unit preferably comprises a plurality of such clamping bolts, for example four clamping bolts.

Alternatively or in addition, provision may also be made that the base unit comprises one or more through-bores for each accommodating a screw, which engages into a complementary threaded bore on a machine table.

The base unit in accordance with the invention is suited, in particular, as a constituent part of a combination of a base unit in accordance with the invention and at least one workpiece support that comprises at least one clamping bolt.

In a preferred embodiment of such a combination, provision is made that the combination comprises a plurality of workpiece supports, which are releasably fixable to the base unit in such a way that they together form an uninterrupted total workpiece support face or a total workpiece support face that is interrupted only by narrow gaps.

The gap between the workpiece support faces of two adjacent workpiece supports hereby has a width of preferably less than 2.0 mm, particularly preferably less than 1.0 mm.

In order to reliably prevent a rotation of a workpiece support fixed to the base unit relative to the base unit, provision is preferably made that at least one of the workpiece supports comprises an anti-rotation element.

In principle, such an anti-rotation element may be formed by a second clamping bolt of the same workpiece support, which in the mounted state of the workpiece support on the base unit engages into a second cover plate through-opening.

Alternatively or in addition, provision may also be made that the anti-rotation element is different from a clamping bolt and preferably comprises an anti-rotation pin, for example a threaded pin, wherein the anti-rotation pin is fixed to the workpiece support and in the mounted state of the workpiece support engages into a recess on the top side of the cover plate of the base unit.

Such a recess may be configured, e.g., as an anti-rotation groove.

Such an anti-rotation groove preferably extends in parallel to a movement direction, along which the fixing element is movable from the rest position into the working position and/or from the working position into the rest position, or in parallel to a transverse direction of the base unit running perpendicularly to the movement direction.

Alternatively, provision may also be made that a recess, for example in the form of a groove, is present on the workpiece support as an anti-rotation element, which cooperates by means of a coupling element with an anti-rotation groove on the top side of the cover plate of the base unit.

Such a coupling element may be configured, e.g., as a feather key, which is in engagement with the recess on the workpiece support and with the anti-rotation groove on the base unit.

When the clamping bolts of the workpiece supports arranged on the base unit in the working position of the fixing element are in engagement with a resilient structure of the fixing element, it is thus ensured that all clamping bolts of the workpiece supports are uniformly and simultaneously in engagement with the fixing element, thereby bringing about a pull-down effect, which pulls the clamping bolts of the workpieces away from the top side of the cover plate of the base unit to the base plate of the base unit.

The combination of the base unit and a plurality of workpiece supports preferably comprises workpiece supports of different sizes, such that a multitude of workpiece support structures that differ in size and shape can be constructed modularly from a plurality of such workpiece supports. The modular construction and the different sizes of the workpiece supports enable the user to construct workpieces of different designs and different shapes and sizes in the same installation space on a workpiece support structure fixed to the base unit, which comprises a plurality of workpiece supports, each with at least one clamping bolt.

A combination of the base unit and one single workpiece support may also be provided, wherein the single workpiece support may cover all cover plate through-openings.

Furthermore, provision may be made that cover plate through-openings not covered by the workpiece support or the workpiece supports are each closed by a respective closure element in order to prevent the penetration of contaminants into the interior of the housing of the base unit.

The orientation and the definition of the zero-point (reference point) of the base unit and/or of the workpiece supports arranged on the base unit may take place using software.

If the base unit in accordance with the invention comprises a pressing mat, such a pressing mat can thus prevent contaminants from being able to enter the interior of the housing of the base unit.

In addition, such a pressing mat can ensure a homogeneous heat dissipation.

Furthermore, such a pressing mat is particularly insensitive to metal powder penetrating into the interior of the housing of the base unit.

The workpiece supports are preferably made of a material that withstands a high temperature load of preferably at least 400° C., in particular at least 500° C., particular preferably at least 650° C.

A basic body of the workpiece supports on which a workpiece support face of the workpiece support is formed is preferably made of a metallic material.

The one or more clamping bolts of the workpiece support may be made, e.g., of a metallic material or of a ceramic material.

The cover plate, the base plate, the fixing element, the driver, and the screw of the base unit are preferably each made of a metallic material.

Clamping bolts by means of which the base unit is releasably fixable to a supporting base or to a clamping device are preferably made of a metallic material or of a ceramic material.

Further features and advantages of the invention are the subject matter of the subsequent description and the illustrative depiction of an exemplary embodiment.

BRIEF DESCRIPTION OF THE DRAWINGS

The same or functionally equivalent elements are provided with the same reference numerals in all Figures.

DETAILED DESCRIPTION OF THE INVENTION

Figure 6:
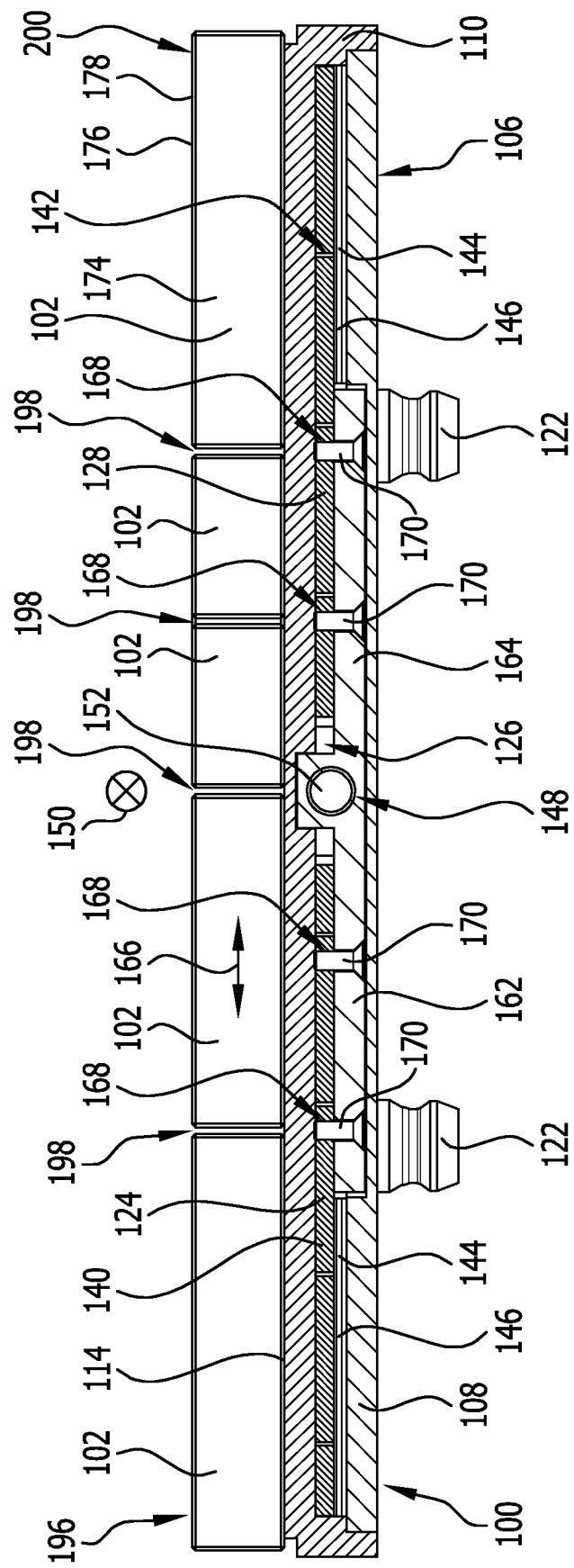
FIG. 6 shows a section taken perpendicularly to a top side of the base unit through the combination of a base unit and a plurality of workpiece supports from FIGS. 1 to 5, in the region of a driver of a movement device of the base unit, which serves to move a fixing element of the base unit from a rest position into a working position or from a working position into the rest position.

A base unit, depicted in FIGS. 1 to 15 and denoted as a whole with 100, for releasably fixing workpiece supports 102, which each comprise one or more clamping bolts 104 (see e.g. the workpiece support 102 depicted in FIGS. 16 and 17), comprises a housing 106, which comprises a base plate 108 and a cover plate 110 (see e.g. FIG. 6).

Figure 1:
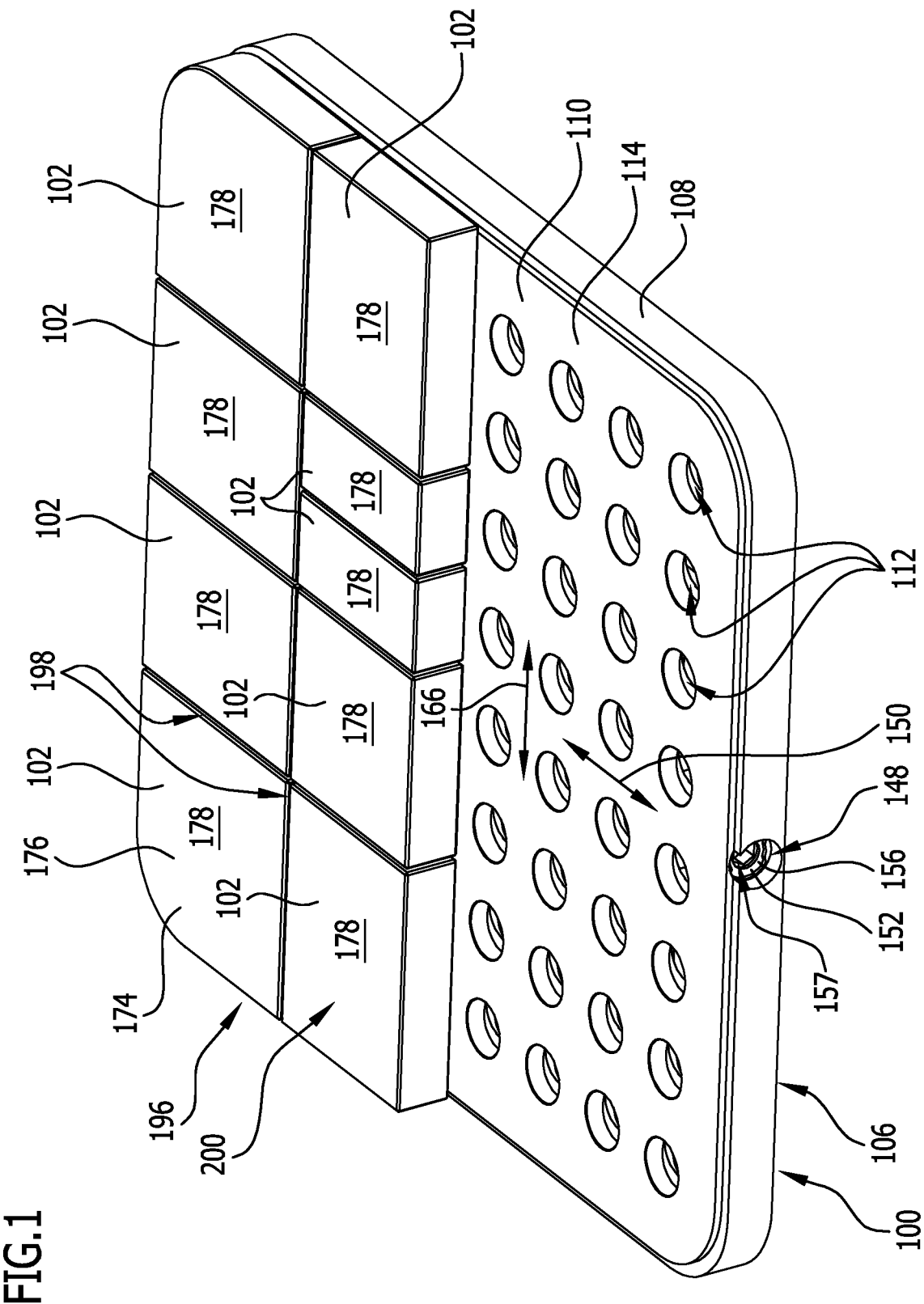
FIG. 1 shows a perspective depiction of a combination of a base unit for releasably fixing workpiece supports, which each comprise at least one clamping bolt, and a plurality of workpiece supports of different sizes, which each comprise one or more clamping bolts and are releasably fixed to the base unit in such a way that in each case two of the workpiece supports are arranged adjacent to one another and the workpiece supports together form a nearly closed workpiece support face that is interrupted only by narrow gaps.
Figure 2:
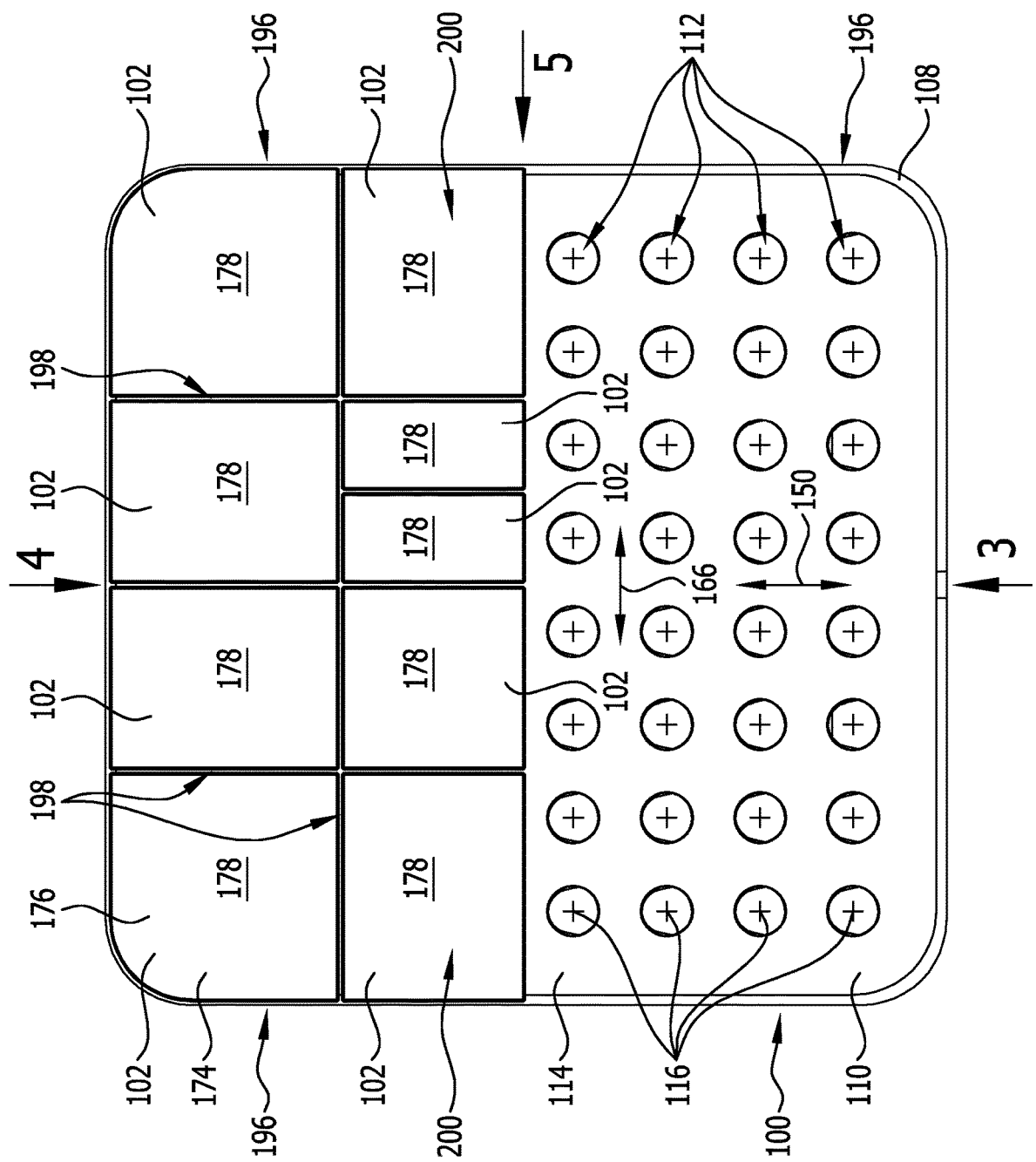
FIG. 2 shows a plan view from above of the combination of a base unit and a plurality of workpiece supports from FIG. 1.
Figure 3:
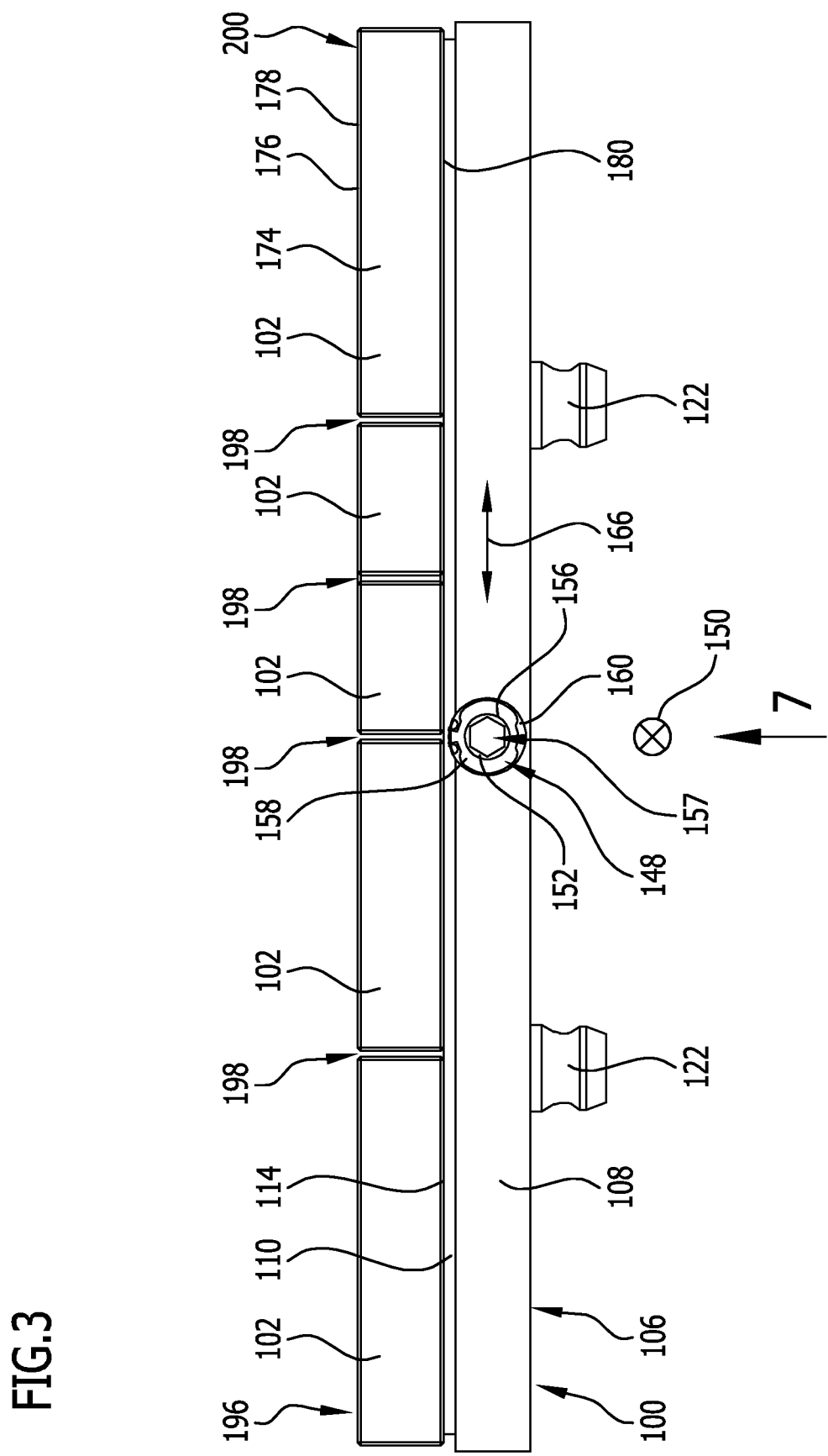
FIG. 3 shows a front view of the combination of a base unit and a plurality of workpiece supports from FIGS. 1 and 2, with the viewing direction in the direction of arrow 3 in FIG. 2.
Figure 4:
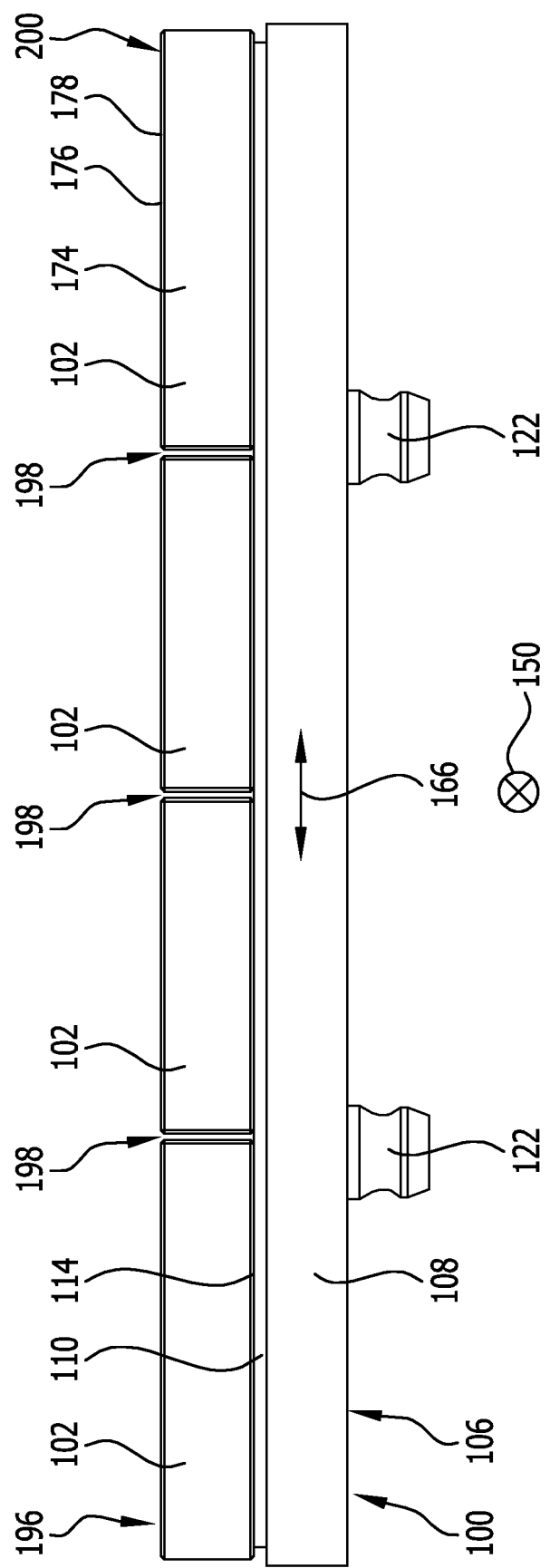
FIG. 4 shows a back view of the combination of a base unit and a plurality of workpiece supports from FIGS. 1 to 3, with the viewing direction in the direction of arrow 4 in FIG. 2.
Figure 5:
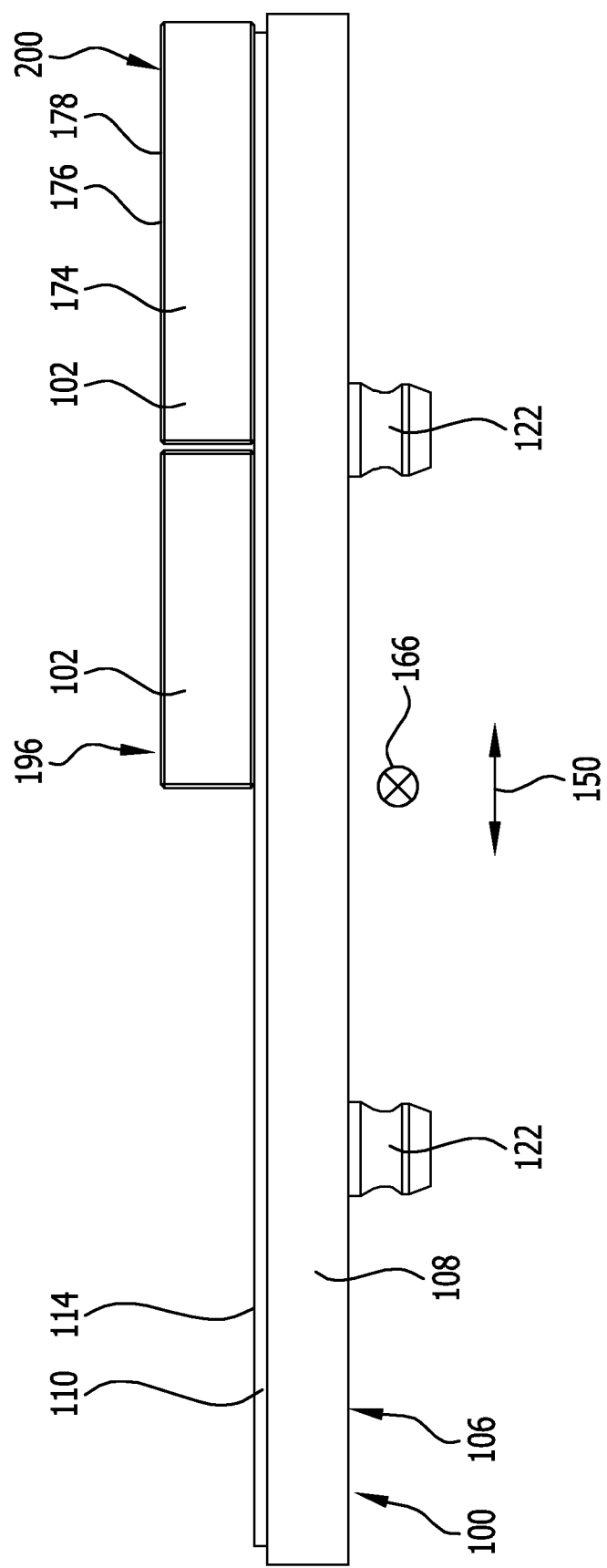
FIG. 5 shows a side view of the combination of a base unit and a plurality of workpiece supports from FIGS. 1 to 4, with the viewing direction in the direction of arrow 5 in FIG. 2.

As can be seen, for example, in FIG. 2, the cover plate 110 is provided with cover plate through-openings 112 through each of which a clamping bolt 104 of a workpiece support 102 can pass when the respective workpiece support 102 is arranged on a top side 114 of the cover plate 110.

The midpoints 116 of the cover plate through-openings 112 are preferably arranged at the grid points of a regular grid. In the graphically represented embodiment, the midpoints 116 of the cover plate through-openings 112 are arranged at the grid points of a square grid.

The square grid comprises, for example, eight rows and eight columns of cover plate through-openings 112, thus a total of 8×8=64 cover plate through-openings 112, for example.

Figure 7:
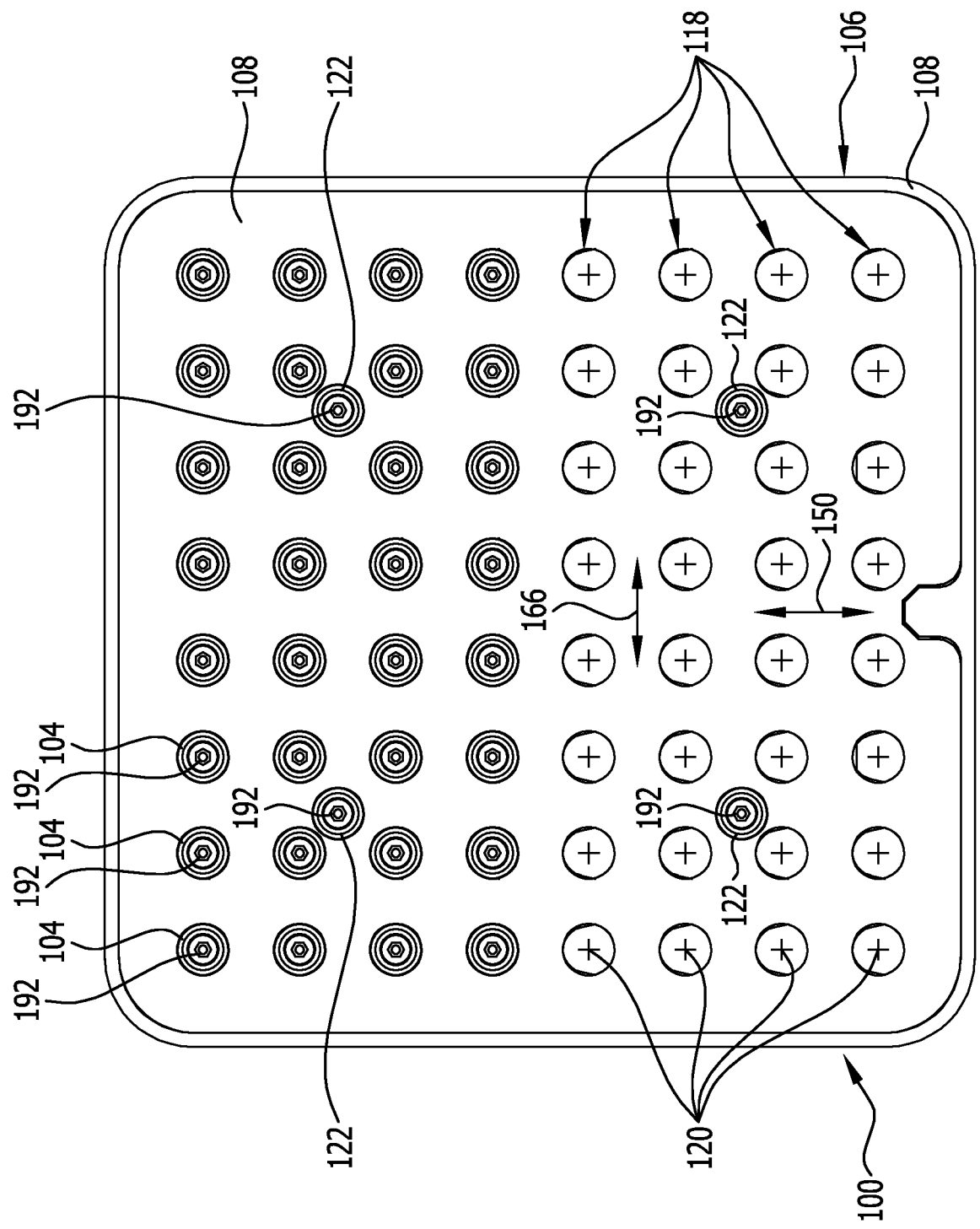
FIG. 7 shows a plan view of the combination of a base unit and a plurality of workpiece supports from FIGS. 1 to 6 from the bottom, with the viewing direction in the direction of arrow 7 in FIG. 3.

As can be seen best in FIG. 7, in this embodiment the base plate 108 is also provided with through-openings, namely base plate through-openings 118, and the clamping bolts 104 of workpiece supports 102, which are arranged on the top side 114 of the cover plate 110 of the base unit 100, each extend into one of these base plate through-openings 118.

The midpoints 120 of the base plate through-openings 118 are also preferably arranged at the grid points of a regular grid.

In the graphically represented embodiment, the midpoints 120 of the base plate through-openings 118 are arranged in a square grid.

The square grid of the base plate through-openings 118 comprises, for example, eight rows and eight columns of base plate through-openings 118, thus a total of 8×8=64 base plate through-openings 118, for example.

As can also be seen in FIG. 7 and, for example, in FIG. 6, the base unit 100 further comprises a plurality, in the embodiment depicted namely four, clamping bolts 122 by means of which the base unit 100 is releasably fixable to a base or to a clamping device (not depicted).

Such a clamping device may comprise, e.g., one or more zero-point clamping systems, which each comprise a receptacle into each of which a clamping bolt 122 is insertable and is lockable there, for example by spring force or by the effect of a pressurized fluid on a piston.

The base unit 100 further comprises a fixing element 124, which is arranged in the interior 126 of the housing 106 of the base unit 100 surrounded by the base plate 108 and the cover plate 110.

Figure 14:
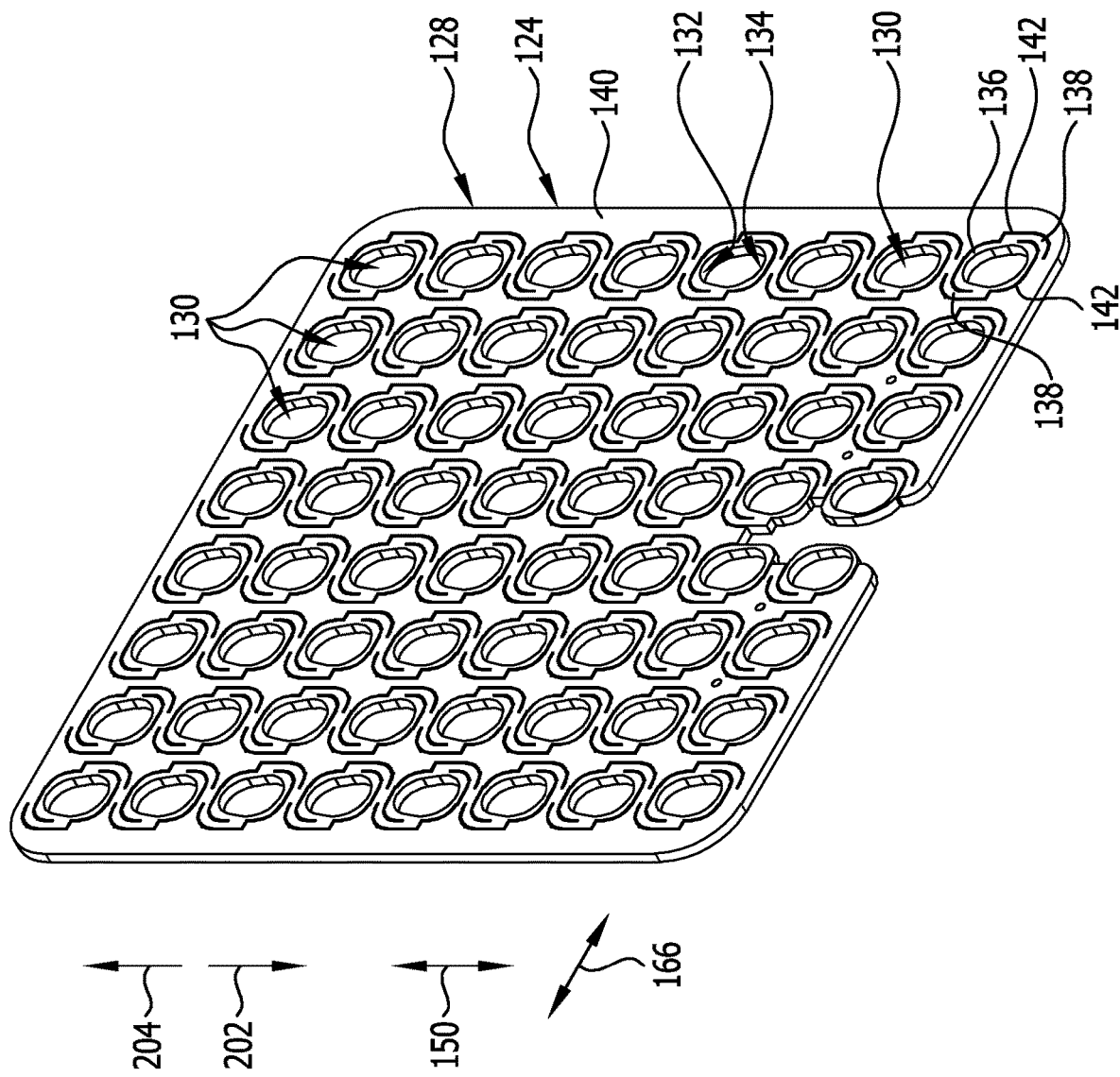
FIG. 14 shows a perspective depiction of the fixing element of the base unit from FIGS. 1 to 13.
Figure 15:
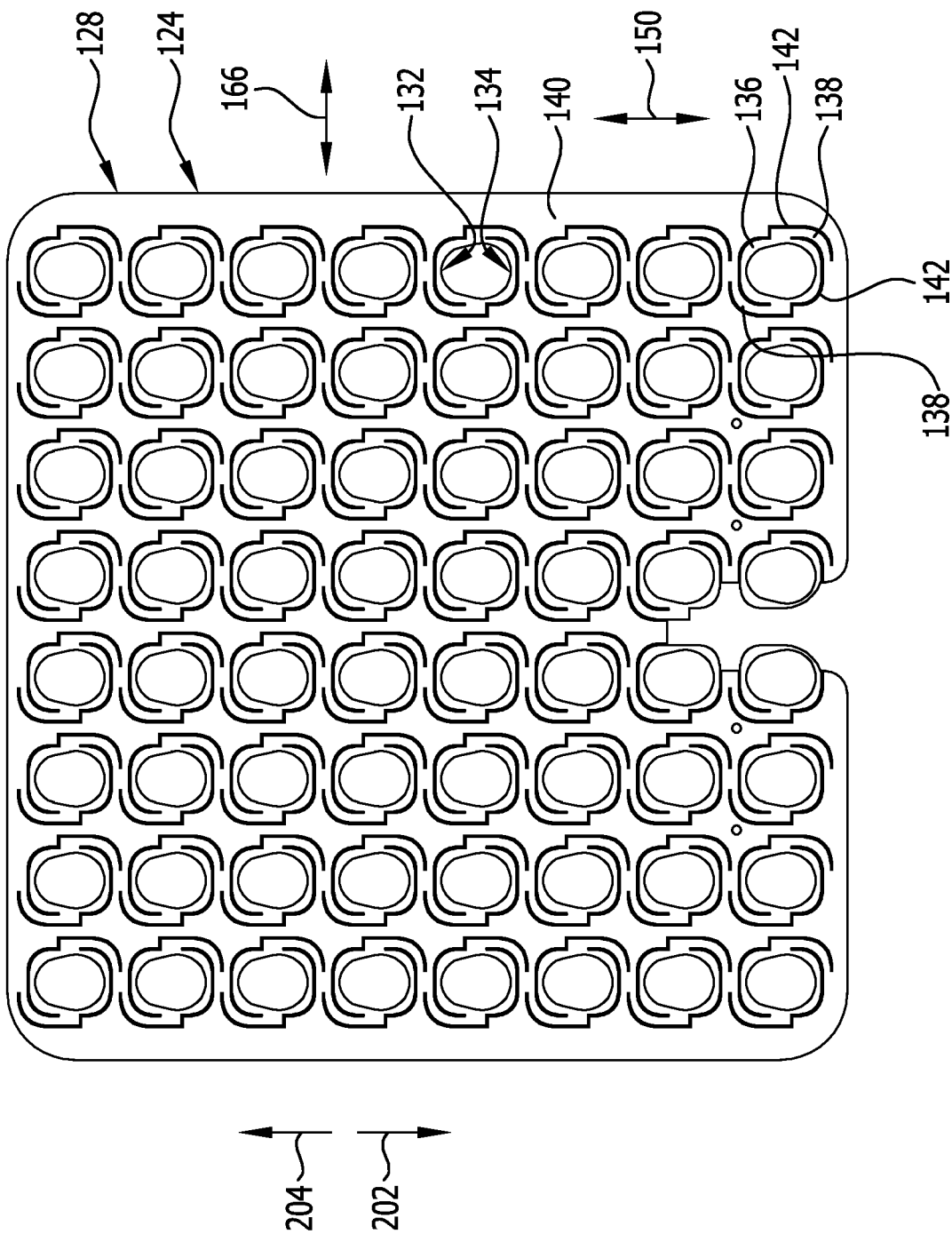
FIG. 15 shows a plan view of the fixing element from FIG. 14 from above on a top side of the fixing element that faces toward a cover plate of the base unit.

The fixing element 124 is separately depicted in FIGS. 14 and 15 and is configured, e.g., as a fixing plate 128.

For each cover plate through-opening 112 in the cover plate 110, the fixing element 124 comprises a respective associated fixing plate through-opening 130, which is in alignment with the respectively associated cover plate through-opening 112.

As can best be seen in FIG. 15, each fixing element through-opening 130 comprises a rim region 132, which has a smaller radius of curvature, and a rim region 134, which has a greater radius of curvature.

Figure 10:
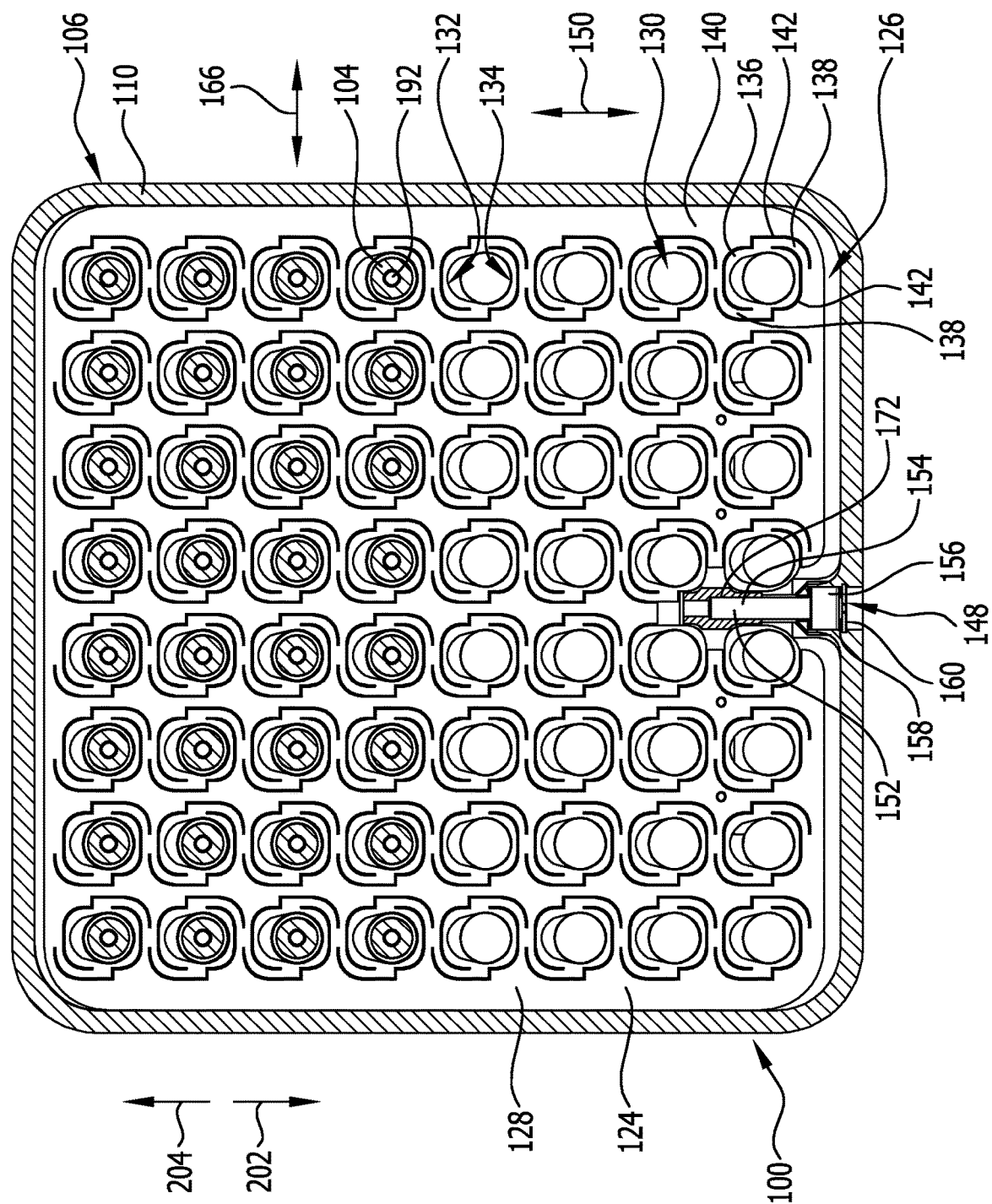
FIG. 10 shows a cross section corresponding to FIG. 8 through the combination of a base unit and a plurality of workpiece supports from FIGS. 1 to 9, at the height of the fixing element, wherein the fixing element is located in the rest position in which the clamping bolts of the workpiece supports are not locked to the base unit.

As can be seen in FIG. 10, which shows the base unit 100 in a rest position of the fixing element 124, the clamping bolts 104 of the workpiece supports 102 in this rest position of the fixing element 124 extend through a portion of the respectively associated fixing element through-opening 130, which is bounded by the rim region 134 with the greater radius of curvature, wherein the clamping bots 104 are not clamped by the fixing element 124 and are preferably not in contact anywhere with the fixing element 124.

Figure 8:
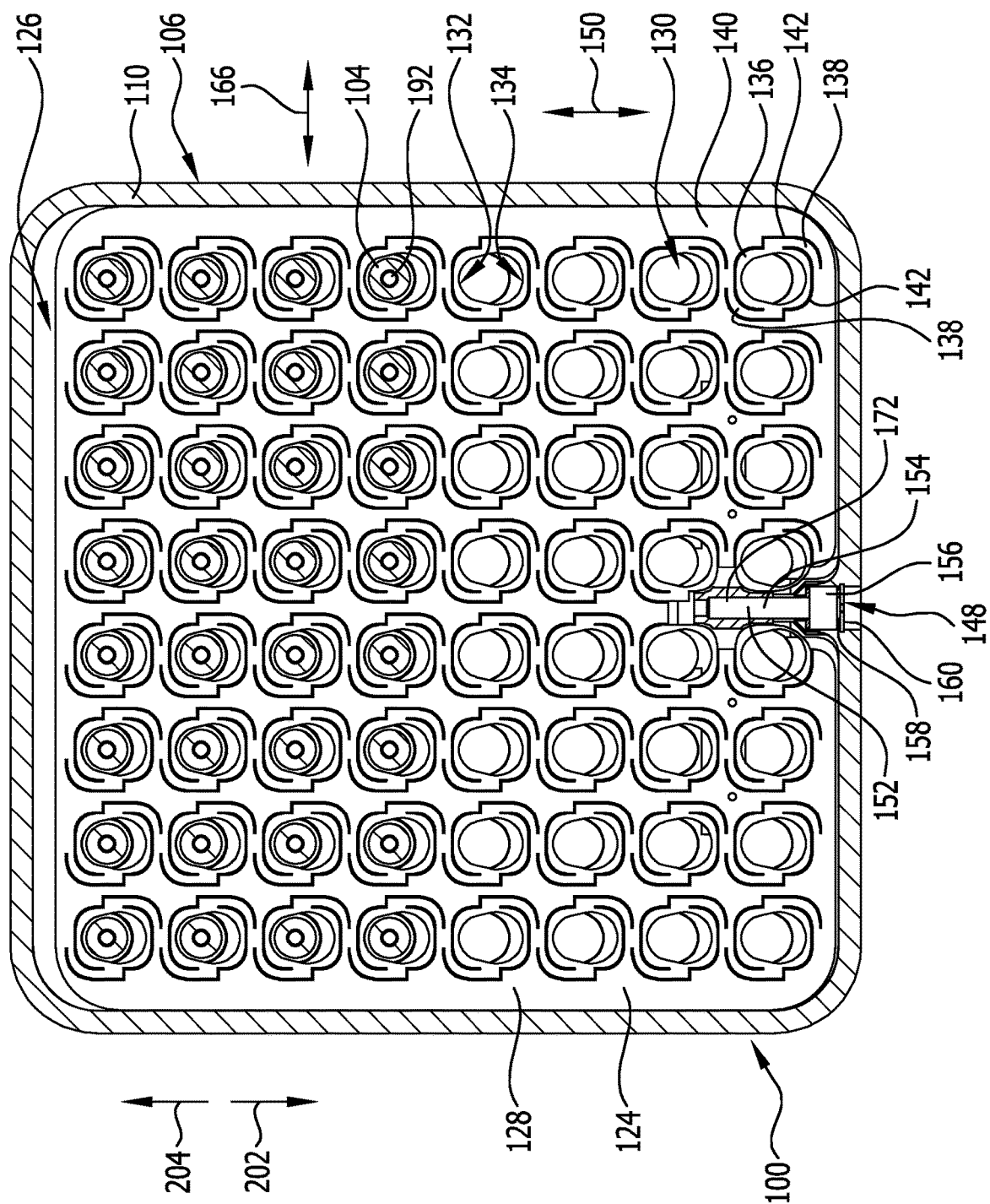
FIG. 8 shows a cross section taken in parallel to the top side of the base unit through the combination of a base unit and a plurality of workpiece supports from FIGS. 1 to 7, at the height of the fixing element, which is provided with fixing element through-openings through each of which a clamping bolt of a workpiece support can pass and by means of which the clamping bolts of the workpiece supports are fixable to the base unit, wherein the fixing element is located in a working position in which the clamping bolts of the workpiece supports are locked to the base unit.

In the working position of the fixing element 124 depicted in FIG. 8, by contrast, the fixing element 124 is displaced relative to the clamping bolts 104 of the workpiece supports 102 such that the clamping bolts 104 extend through a portion of the respectively associated fixing element through-opening 130, which is bounded by the rim region 132 with the smaller radius of curvature.

In this working position of the fixing element 124, each clamping bolt 104 is in contact with the fixing element 124 at two clamping points on the rim of the respective fixing element through-opening 130 associated with the clamping bolt 104, such that the respective clamping bolt 104 is clamped by the fixing element 124, thereby pulling the clamping bolt 104 downwards into the respectively associated base plate through-opening 118 and locking it to the base unit 100 by positive engagement.

Each fixing element through-opening 130 is arranged on a clamping frame 136, which is elastically resiliently held on a basic body 140 of the fixing element 124 by way of two resilient arms 138.

The basic body 140, the resilient arms 138, and the clamping frames 136 of the fixing element 124 are preferably all formed in one piece with one another.

The mobility of the clamping frames 136 relative to the basic body 140 of the fixing element 124 is achieved by each clamping frame 136 and each of the resilient arms 138 being separated from the basic body 140 by two contour cuts 142.

Furthermore, the contour cuts 142 also separate portions of the clamping frame 136 from adjacent portions of the resilient arms 138.

The fixing element 124 is produced from a flat starting material, for example a metal sheet, by the contour cuts 142 being introduced into the flat starting material and the fixing element through-openings 130 being separated out of the flat starting material, for example punched out or cut out, for example by means of a laser.

As a result of the elastically resilient mounting of the clamping frames 136 relative to the basic body 140 of the fixing element 124 and as a result of the floating mounting of the fixing element 124 in the interior 126 of the housing 106 of the base unit 100, tolerances in the position of the clamping bolts 104 relative to the position of the fixing element 124 and tolerances in the position and shape of the cover plate through-openings 112 in relation to the position of the fixing element through-openings 130 are compensated for. This makes it possible to clamp all clamping bolts 104 of workpiece supports 102 arranged on the top side 114 of the cover plate 110 of the base unit 100 simultaneously and equally tight on the base unit 100 and to fix them in their position on the base unit 100.

The base unit 100 further comprises an elastically deformable pressing element 144 by means of which the fixing element 124 is pressable against the cover plate 110 of the base unit 100 (see e.g. FIG. 6).

The pressing element 144 is configured, e.g., as a pressing mat 146.

The pressing mat 146 is preferably configured as a flexible heat-resistant fiber mat.

For each fixing element through-opening 130, the pressing element 144 comprises a respective pressing element through-opening associated therewith, through which a clamping bolt 104 of a workpiece support 102 accommodated in the fixing element through-opening 130 can extend.

By biasing the fixing element 124 against the cover plate 110 of the base unit 100 by means of the elastically deformable pressing element 144, it is ensured that the clamping contours of the fixing element through-openings 130 are always able to enter into engagement with the respectively associated clamping bolt 104 of a workpiece support 102.

In addition, the pressing element 144 at least partially prevents the ingress of contaminants into the interior 126 of the housing 106 of the base unit 100 and/or a spread of contaminants in the interior 126 of the housing 106 of the base unit 100.

Such contaminants may comprise, e.g., metal powder particles, which arise when a workpiece is built in a 3D printing process on one or more of the workpiece supports 102.

Figure 9:
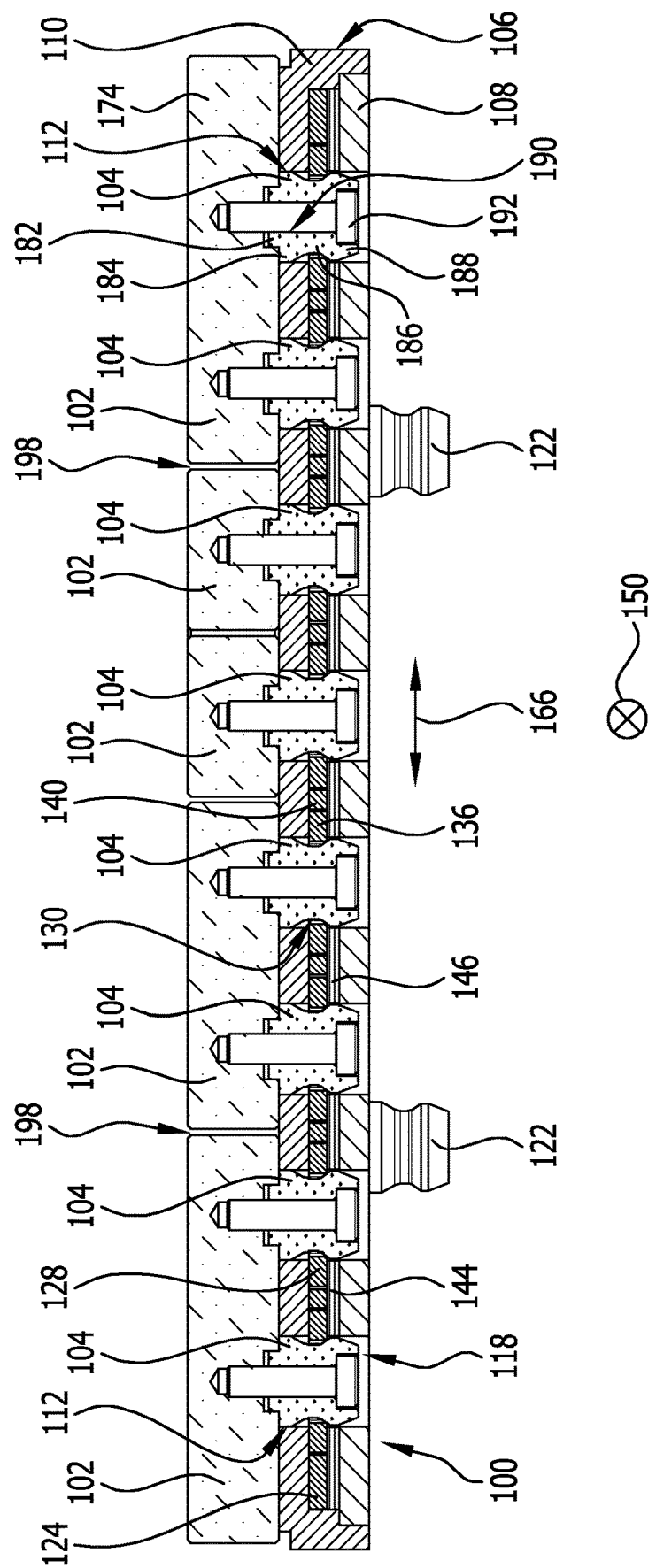
FIG. 9 shows a further section taken in parallel to the section plane from FIG. 6 through the combination of a base unit and a plurality of workpiece supports from FIGS. 1 to 8, wherein the section plane is oriented perpendicularly to the top side of the base unit and extends through five of the workpiece supports.
Figure 11:
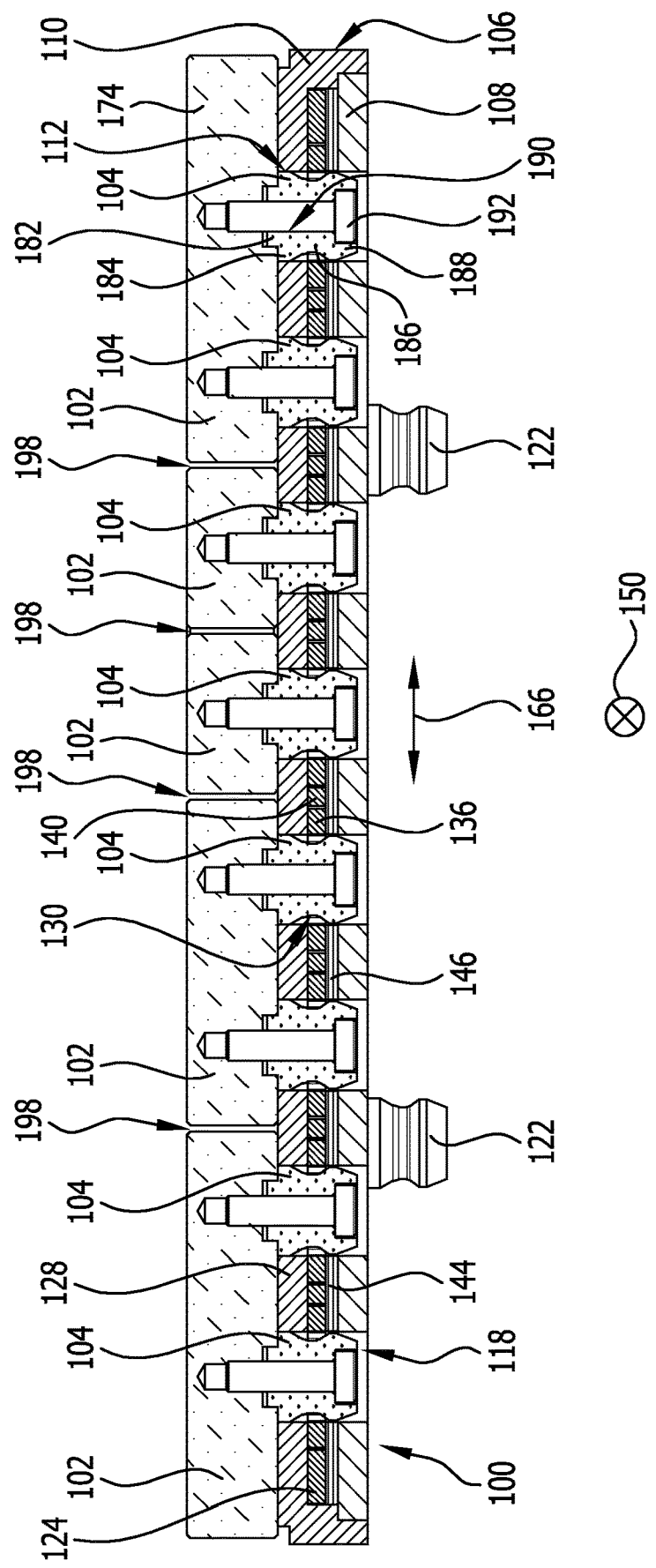
FIG. 11 shows a section corresponding to FIG. 9 through the combination of a base unit and a plurality of workpiece supports, wherein the fixing element is located in the rest position in which the clamping bolts of the workpiece supports are not locked to the base unit.

In order to move the fixing element 124 of the base unit 100 from the rest position depicted in FIGS. 10 and 11, in which the workpiece supports 102 can be lifted from the base unit 100, into the working position depicted in FIGS. 8 and 9, in which the clamping bolts 104 of the workpiece supports 102 are fixed and locked by means of the fixing element 124, the base unit 100 comprises a moving device 148, which comprises a mechanical, pneumatic, or electric drive for the movement of the fixing element 124 from the rest position into the working position and/or from the working position into the rest position.

In the graphically represented embodiment of a base unit 100, the movement device 148 comprises a mechanical drive for the movement of the fixing element 124 from the rest position into the working position along a movement direction 150 (see e.g. FIGS. 8 and 10).

Figure 12:
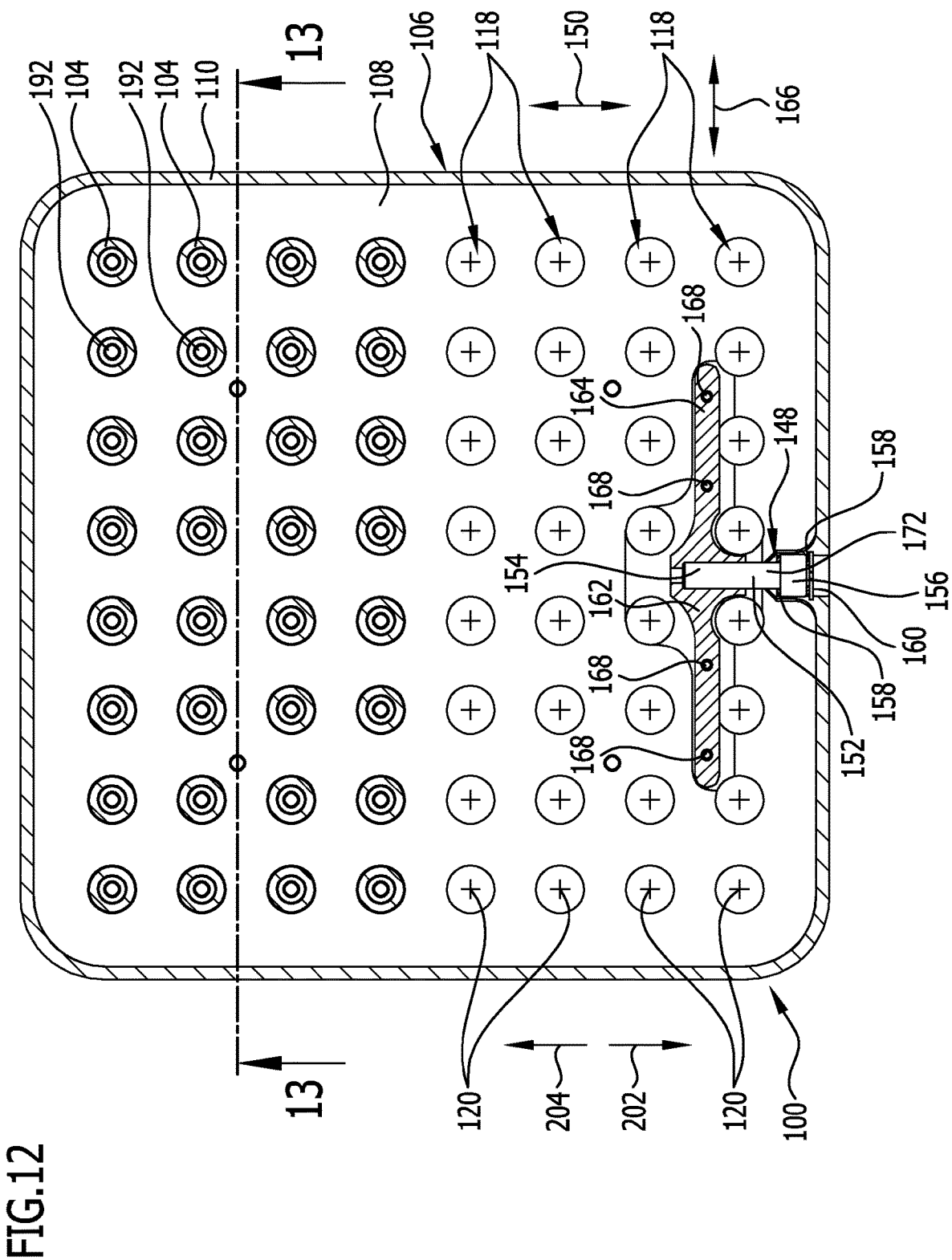
FIG. 12 shows a cross section taken in parallel to the section plane of FIGS. 8 and 10 through the combination of a base unit and a plurality of workpiece supports at a lower height, at a greater distance from the top side of the base unit, wherein the section plane extends through the driver of the movement device of the base unit and the fixing element is located in the working position in which the clamping bolts of the workpiece supports are locked to the base unit.

As can be seen best in FIG. 12, the movement device 148 comprises, e.g., a screw 152, the shank 154 of which extends in parallel to the movement direction 150 and the head 156 of which is fixed in the axial direction, but is mounted on the housing 106 of the base unit 100, i.e. on the cover plate 110 and/or on the base plate 108, so as to be rotatable about the longitudinal axis of the screw 152.

The mounting of the head 156 of the screw 152 may be effected, e.g., by means of bearing discs 158, which abut against a bottom side or against a top side of the head 156.

These bearing discs 158 may be made, e.g., of brass.

The screw 152 is held in its predetermined axial position by means of a securing ring 160.

The head 156 of the screw 152 is provided with a receptacle 157 for an actuating tool.

This receptacle may comprise, in particular, a polygonal cross section, for example a hexagonal cross section.

The external thread of the screw 152 on the shank 154 is in engagement with a complementary internal thread of a driver 162, which has, e.g., the shape of a web-shaped pusher 164, which extends in a transverse direction 166 of the base unit 100 that is perpendicular to the movement direction 150.

The driver 162 is coupled to the fixing element 124 at one or more, for example at four, coupling points 168 (see FIG. 6).

The coupling between the driver 162 and the fixing element 124 may be produced, for example, by screwing by means of coupling screws 170, by riveting, or in a materially bonded manner, for example by welding, soldering, or adhesion.

The driver 162 is thus fixed to the fixing element 124 and is in engagement with the screw 152, which serves as a drive element 172.

The driver 162 thus enables a force transmission from the drive element 172, for example the screw 152, to the fixing element 124.

Figure 16:
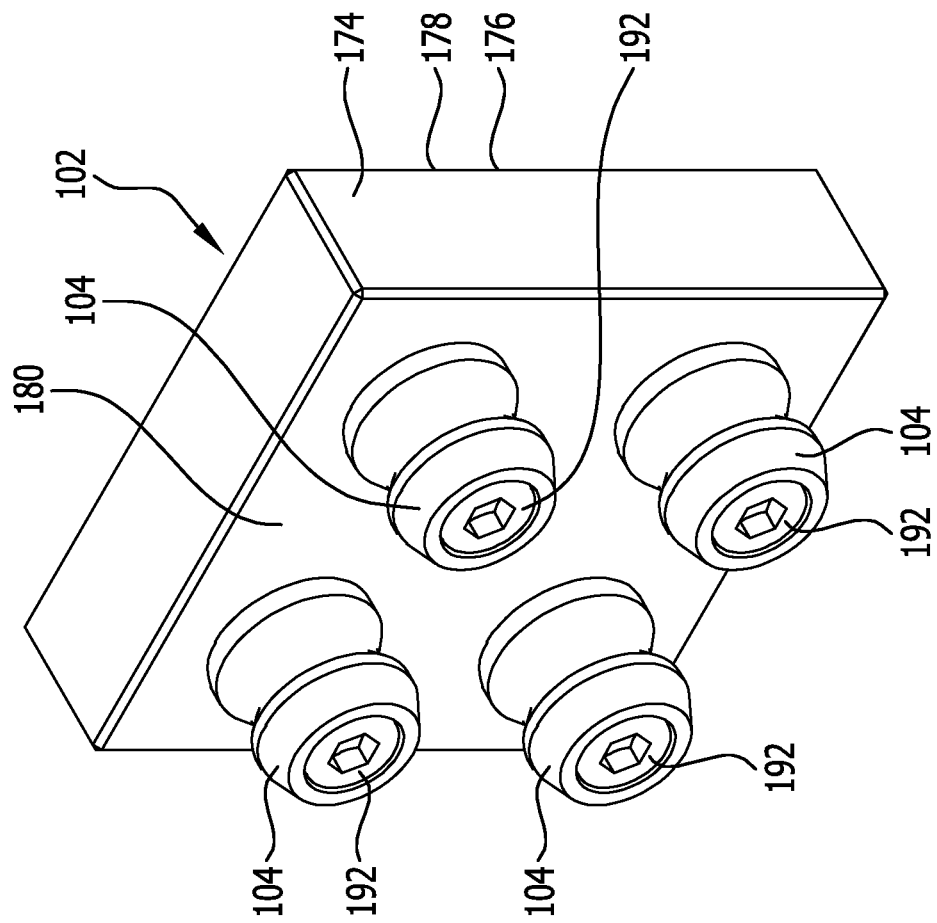
FIG. 16 shows a perspective depiction of one of the workpiece supports from FIGS. 1 to 13, which comprises a basic body with a square footprint and four clamping bolts, with the viewing direction toward a bottom side of the workpiece support that faces toward the cover plate of the base unit in the mounted state of the workpiece support.
Figure 17:
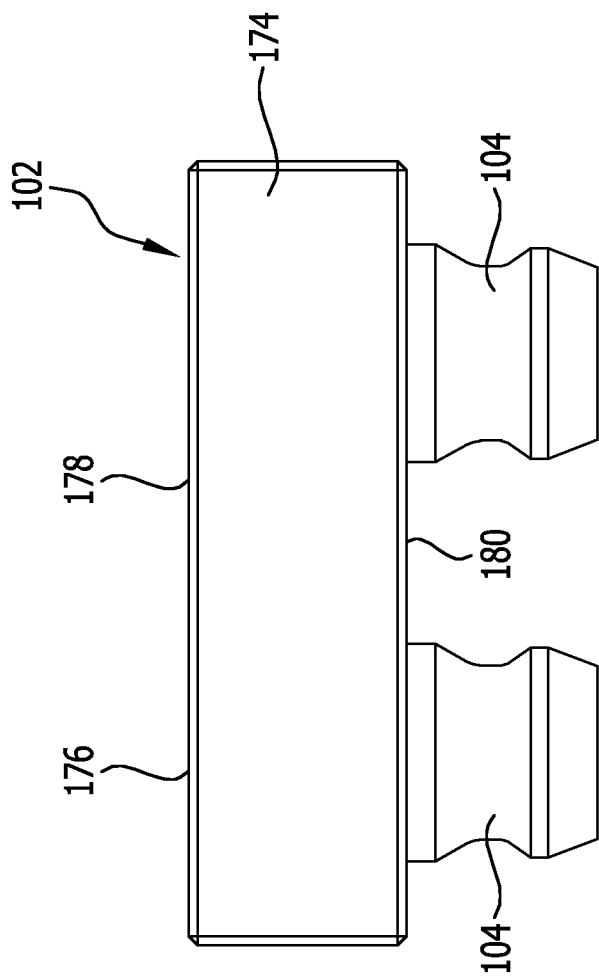
FIG. 17 shows a front view of the workpiece support from FIG. 16.

One of the workpiece supports 102 is depicted as an example in FIGS. 16 and 17.

Each workpiece support 102 comprises a basic body 174, which is preferably of substantially cuboidal configuration.

A top side 176 of the basic body 174 serves as a workpiece support face 178 of the workpiece support 102, on which a workpiece or part of a workpiece can be built by a building process, for example by a 3D printing process.

On a bottom side 180 of the workpiece support 102 that faces away from the workpiece support face 178 of the workpiece support 102, one or more clamping bolts 104 are arranged.

Figure 13:
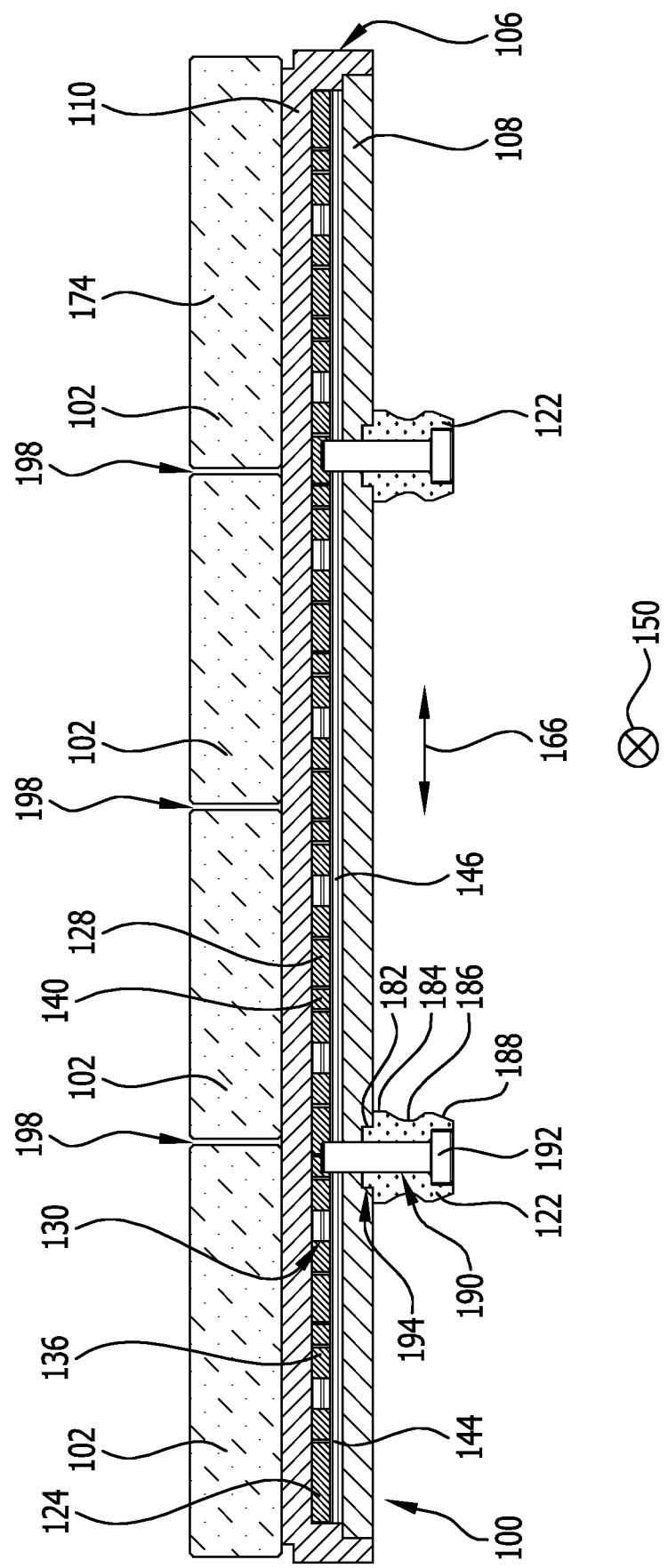
FIG. 13 shows a section taken in parallel to the section plane of FIGS. 9 and 11 through the combination of a base unit and a plurality of workpiece supports, in the region of the four rear workpiece supports, along line 13-13 in FIG. 12.

These clamping bolts 104 may be structured exactly like the clamping bolts 122, which are arranged on the bottom side of the base plate 108 of the base unit 100 and are depicted in section in FIG. 13, to which reference is made in the following.

Each clamping bolt 104 or 122 comprises a fitting projection 182, a centering collar 184, a constriction region 186, and a thickened end region 188, wherein the constriction region 186 has a smaller outer diameter than the thickened end region 188 and the centering collar 184.

Each clamping bolt 104 or 122 is passed through by a central stepped bore 190, which in the mounted state of the clamping bolt 104, 122 accommodates a captive screw 192.

In the mounted state of the clamping bolt 104, 122 the captive screw 192 extends with its external thread into a complementary internal thread that is formed on the basic body 174 of the workpiece support 102 or on the base plate 108 of the base unit 100.

The threaded hole of the workpiece support 102 or the base plate 108 provided with this internal thread is surrounded by a fitting bore 194, which in the mounted state of the clamping bolt 104, 122 accommodates the complementarily formed fitting projection 182 of the clamping bolt 104, 122 and thereby enables a precise orientation of the clamping bolt 104, 122 in parallel to the longitudinal central axis of the threaded hole.

The centering collar 184 of the clamping bolt 104, 122 in the mounted state of the clamping bolt 104, 122 abuts against the bottom side 180 of the workpiece support 102 or against the bottom side of the base plate 108 of the base unit 100.

Of the workpiece supports 102, each is preferably provided with at least two clamping bolts 104, thereby achieving an anti-rotation protection of the workpiece support 102 when the at least two clamping bolts 104 are fixed and locked in respectively associated fixing element through-openings 130 of the base unit 100.

As can be seen in FIGS. 1 to 5, the plurality of workpiece supports 102, the basic bodies 174 of which are all equally high and the workpiece support face edges of which all have the same length as the edge of another workpiece support face 178 or an integral multiple of the length of the edge of another workpiece support face 178, form a modular workpiece support system, which makes it possible to form a workpiece support structure 196 on the top side 114 of the base plate 108, in which the workpiece support faces 178 of the workpiece supports 102 together form a continuous total workpiece support face 200 (aside from narrow gaps 198).

By adding or removing workpiece supports 102, this total workpiece support face 200 can be adapted with respect to its shape and size to the respective requirement.

In particular, provision may be made that substantially the entire top side 114 of the cover plate 110 of the base unit 100 is covered by workpiece supports 102, which together form a total workpiece support face 200, the area of which substantially corresponds to the area of the top side 114 of the cover plate 110 of the base unit 100.

The basic bodies 174 of the workpiece supports 102 are preferably made of a heat-resistant metallic material.

The clamping bolts 104 of the workpiece supports 102 are preferably made of a heat-resistant ceramic material.

On the total workpiece support face 200 formed by the workpiece support structure 196, one or more workpieces can be formed in a building process, for example by metal 3D printing.

After performing the building process, individual or a plurality of the workpiece supports 102, together with the workpiece built, can be released from the base unit 100 and then fixed and locked by means of their clamping bolts 104 in a tool apparatus (not depicted) for performing a processing, for example machining, of the workpiece built.

As a result, a workpiece built on the total workpiece support face 200 can, for example, be further processed and/or measured in a conventional manner in a subsequent process.

By dividing the total workpiece support face 200 into the workpiece support faces 178 of a plurality of modular workpiece supports 102, any shape of the total workpiece support face 200 can be composed from different workpiece support faces 178 of different workpiece supports 102, which each form segments of the total workpiece support face 200.

The workpiece supports 102 are each placed on the cover plate 110 of the base unit 100 such that their clamping bolts 104 each engage into a cover plate through-opening 112 of the cover plate 110 of the base unit 100.

Here the outer diameters of the centering collars 184 of the clamping bolts 104 on the one hand and the inner diameters of the cover plate through-openings 112 of the cover plate 110 on the other hand match one another so precisely that a centering of the clamping bolts 104 relative to the cover plate through-openings 112 is achieved.

By way of the geometry of the clamping bolts 104 on the workpiece supports 102 and the geometry of the cover plate through-openings 112, the workpiece supports 102 are precisely oriented relative to the movement direction 150 and relative to the transverse direction 166 of the base unit 100.

When the workpiece supports 102 are placed on the cover plate 110 of the base unit 100, the fixing element 124 of the base unit 100 is located in its rest position depicted in FIGS. 10 and 11.

By means of the movement device 148 of the base unit 100, the fixing element 124 is displaced in the locking direction 202, which is oriented in parallel to the movement direction 150, in order to transfer the fixing element 124 from the rest position depicted in FIGS. 10 and 11 into the working position depicted in FIGS. 8 and 9.

This is achieved by an operator rotating the screw 152 by means of an actuating tool, which engages on the head 156 of the screw 152 of the movement device 148, about its longitudinal axis such that the driver 162 that is in engagement with the external thread of the screw 152 is displaced in the locking direction 202 relative to the housing 106 of the base unit 100.

Because the driver 162 is coupled to the fixing element 124, the fixing element 124 is thereby also displaced along the locking direction 202.

The stroke of the displacement movement of the fixing element 124 from the rest position into the working position (or from the working position into the rest position) is preferably at least 2.0 mm, in particular at least 3.0 mm, particularly preferably at least 4.0 mm.

Upon this movement of the fixing element 124, the clamping frames 136 of the fixing element 124, the fixing element through-openings 130 of which are each passed through by a clamping bolt 104 of a workpiece support 102, come into engagement with the clamping bolts 104 and press them downwards in the direction toward the base plate 108 of the base unit 100, such that the clamping bolts 104 penetrate even further into the base plate through-openings 118.

As a result, the workpiece supports 102 are pulled downwards against the top side 114 of the cover plate 110 of the base unit 100, thereby adopting a fixedly defined position on the cover plate 110 of the base unit 100.

In order to again release the workpiece supports 102 from the base unit 100, the fixing element 124 is transferred from the working position depicted in FIGS. 8 and 9 into the rest position depicted in FIGS. 10 and 11 by the screw 152 of the movement device 148 being rotated by an operator by means of a suited actuating tool in a direction of rotation about the longitudinal axis of the screw 152, which is opposite to the direction of rotation of the screw 152 upon moving the fixing element 124 from the rest position into the working position.

The fixing element 124 is thereby displaced in the unlocking direction 204, which is opposite to the locking direction 202, from the working position depicted in FIGS. 8 and 9 into the rest position depicted in FIGS. 10 and 11.

In the rest position of the fixing element 124, the clamping bolts 104 of the workpiece supports 102 are fixed to the base unit 100 neither by positive engagement nor by force fit, such that the workpiece supports 102 can be removed from the cover plate 110 of the base unit 100, wherein the clamping bolts 104 of the workpiece supports 102 exit the respectively associated base plate through-opening 118, the respectively associated fixing plate through-opening 130, and the respectively associated cover plate through-opening 112.

Figure 18:
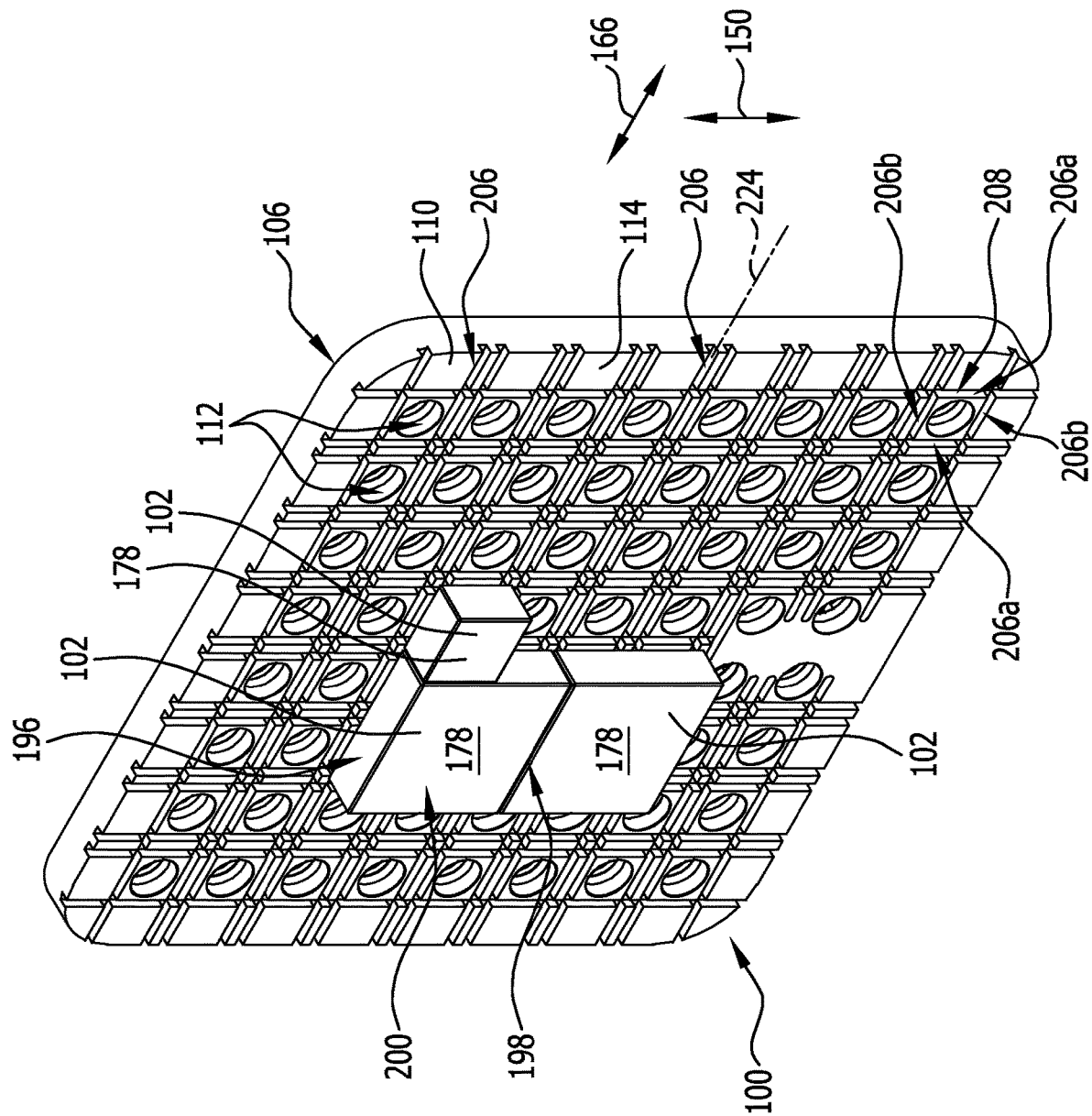
FIG. 18 shows a perspective depiction of a second embodiment of a combination of a base unit for releasably fixing workpiece supports, which each comprise at least one clamping bolt, and a plurality of workpiece supports, which are releasably fixed to the base unit.
Figure 19:
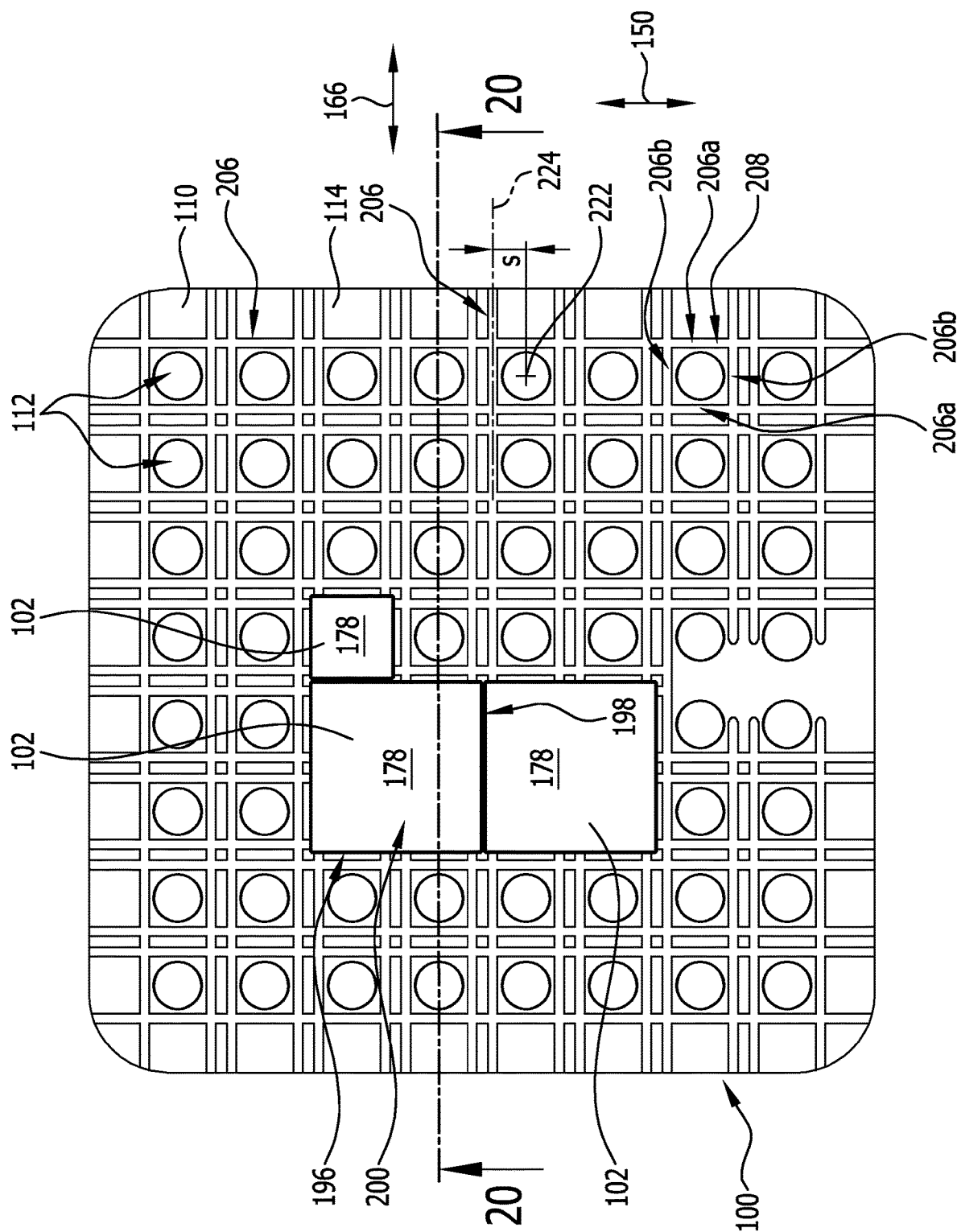
FIG. 19 shows a plan view from above of the top side of the base plate of the base unit from FIG. 18, which is provided with grooves for accommodating anti-rotation elements of the workpiece supports.
Figure 23:
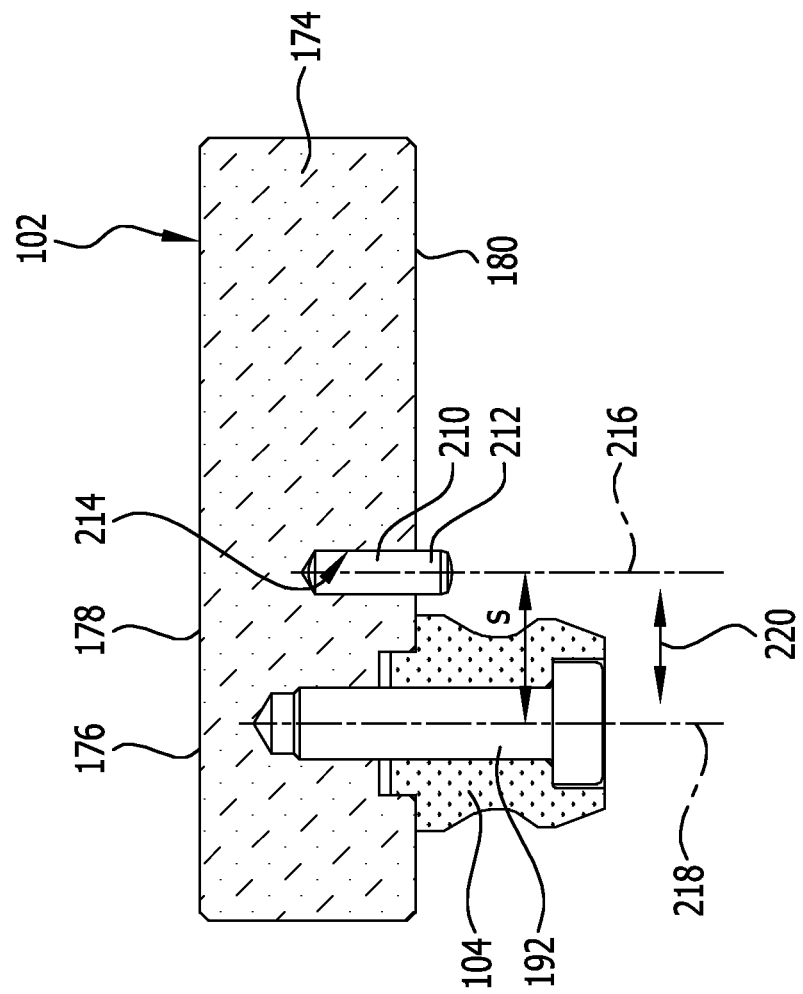
FIG. 23 shows a section taken perpendicularly to a workpiece support face of the workpiece support from FIGS. 21 and 22 through the workpiece support from FIGS. 21 and 22, along line 23-23 in FIG. 22.

A second embodiment, depicted in FIGS. 18 and 23, of a combination of a base unit 100 for releasably fixing workpiece supports 102 and a plurality of such workpiece supports 102 differs from the first embodiment depicted in FIGS. 1 to 17 in that the cover plate 110 of the base unit 100 is not substantially planar, but instead is provided with anti-rotation grooves 206, which are formed on the top side 114 of the cover plate 110.

Here, associated with each cover plate through-opening 112 are two respective first anti-rotation grooves 206a, which extend on opposing sides of the respective cover plate through-opening 112 in parallel to the movement direction 150 of the base unit 100, and two respective second anti-rotation grooves 206b, which extend on opposing sides of the respective cover plate through-opening 112 in parallel to the transverse direction 166 of the base unit 100.

In this way (aside from a few cover plate through-openings 112 that are arranged in the vicinity of the screw 152 of the movement device 148), nearly all cover plate through-openings 112 are surrounded by a rectangular, preferably square, anti-rotation groove structure 208, wherein the anti-rotation groove structure 208 comprises two respective portions of first anti-rotation grooves 206a and two respective portions of second anti-rotation grooves 206b.

Figure 20:
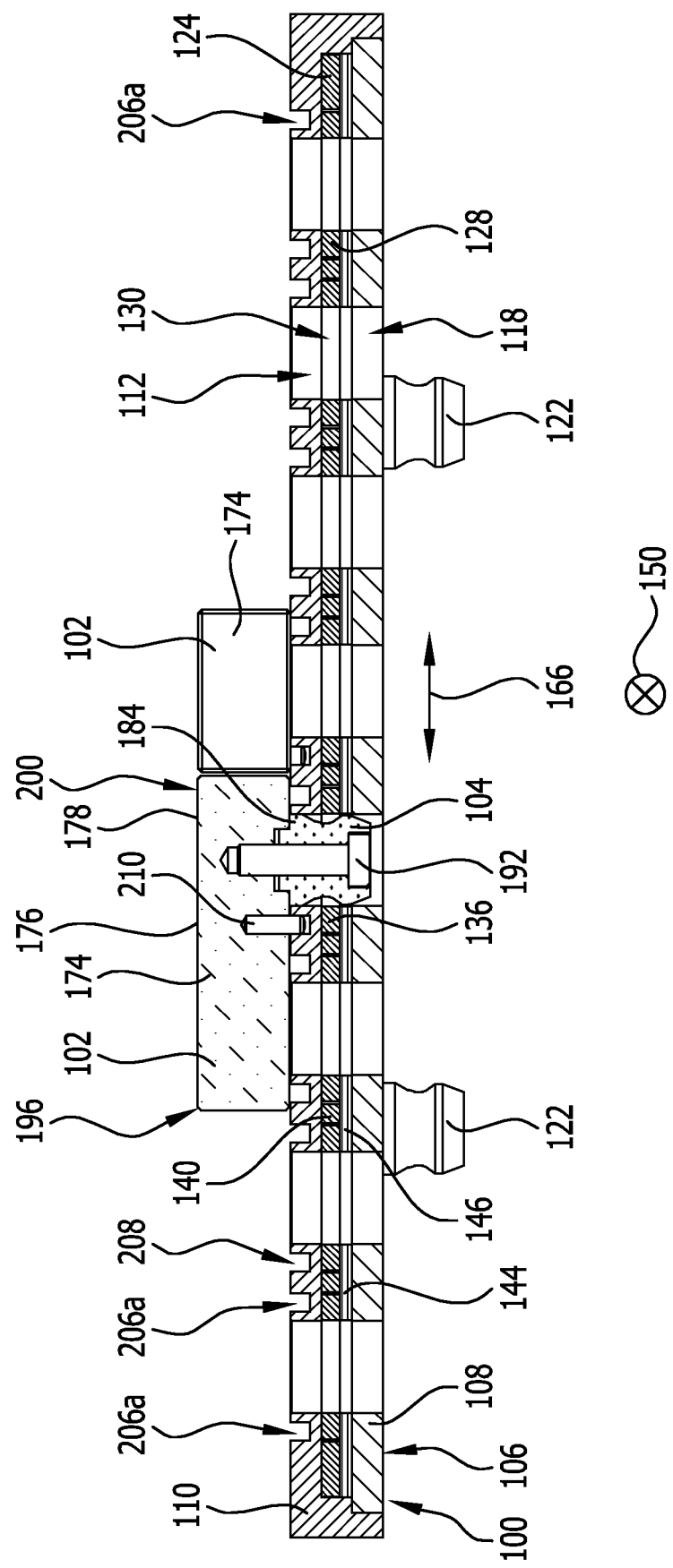
FIG. 20 shows a section taken perpendicularly to the top side of the cover plate of the base unit from FIGS. 18 and 19 through the combination of a base unit and a plurality of workpiece supports from FIGS. 18 and 19, in the region of one of the workpiece supports with a square footprint, along line 20-20 in FIG. 19.

As can be seen best in FIG. 20, the anti-rotation grooves 206 of the base unit 100 cooperate with anti-rotation elements 210 that are arranged on the workpiece supports 102.

Figure 21:
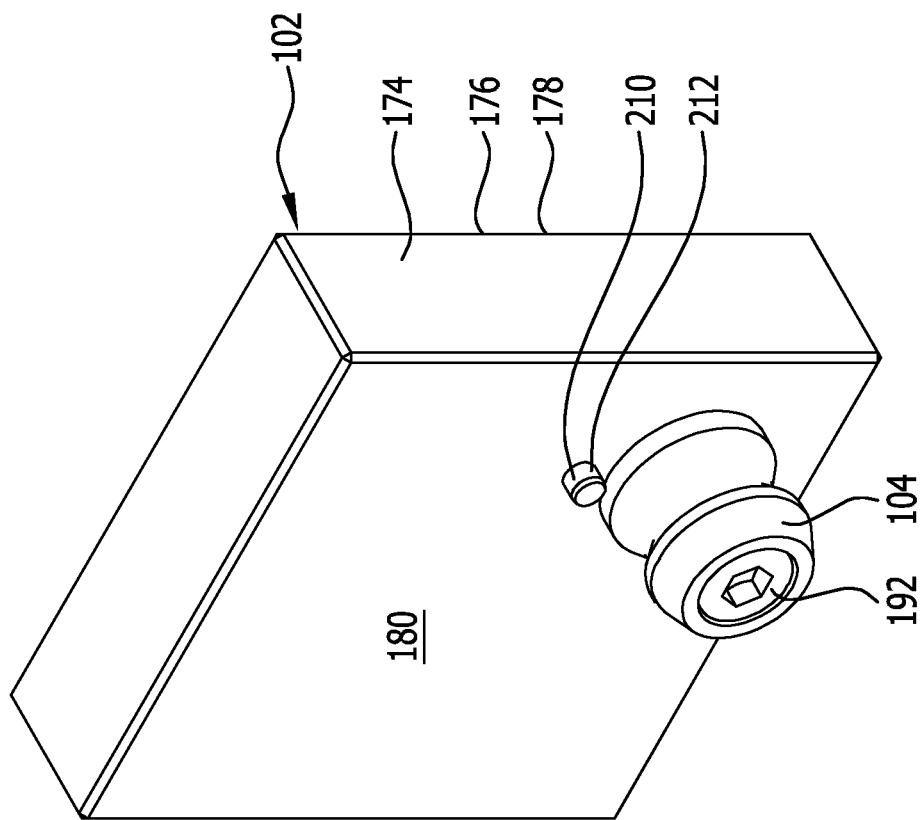
FIG. 21 shows a perspective depiction of one of the workpiece supports from the combination of a base unit and a plurality of workpiece supports from FIGS. 18 to 20, wherein the workpiece support comprises a basic body with a quadratic footprint, a clamping bolt, and an anti-rotation element, with the viewing direction toward a bottom side of the workpiece support that faces toward top side of the cover plate of the base unit in the mounted state of the workpiece support.
Figure 22:
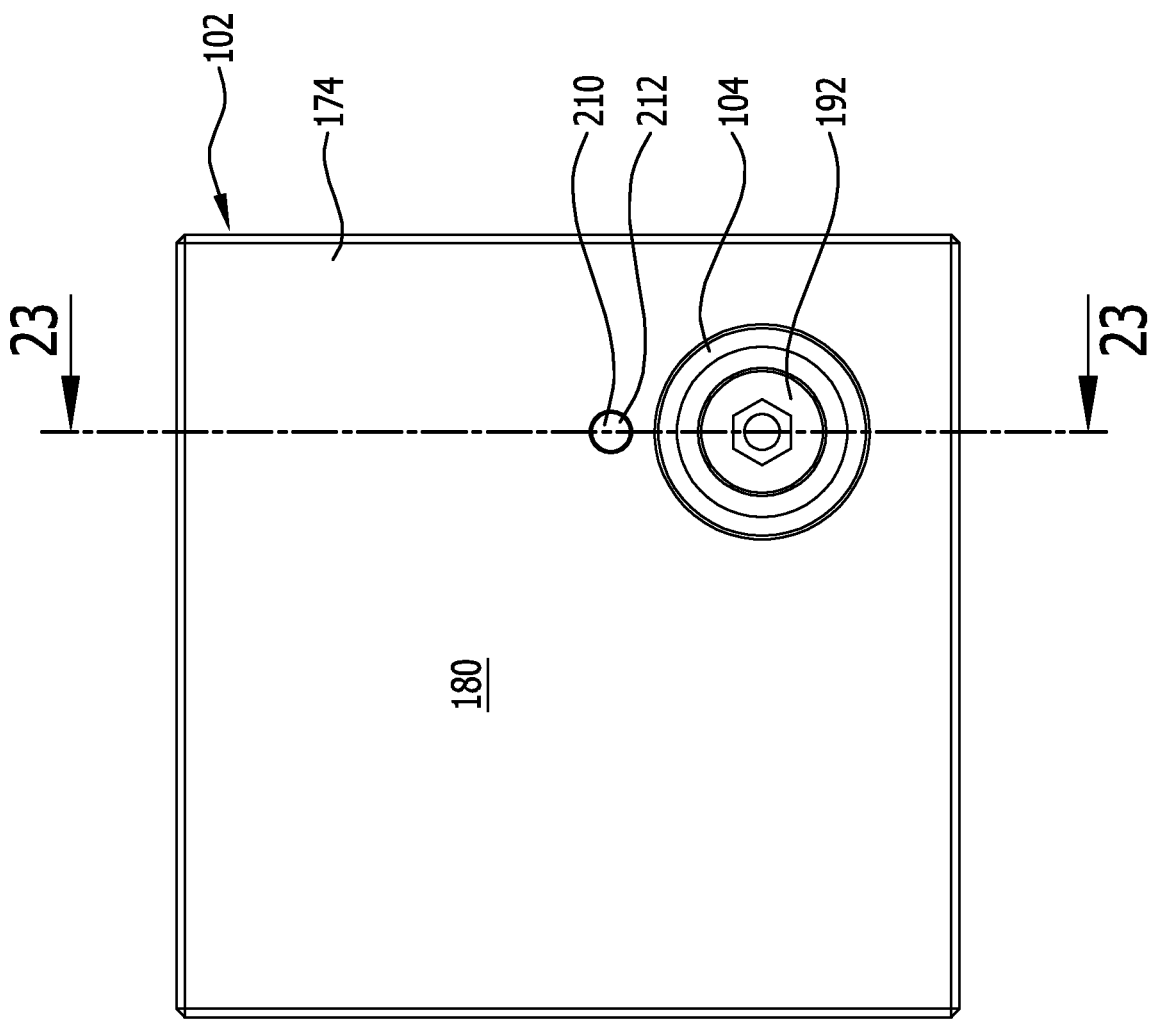
FIG. 22 shows a plan view of the bottom side of the workpiece support from FIG. 21.

Depicted as an example in FIGS. 21 to 23 is a workpiece support 102 with a square workpiece support face 178.

Arranged on the bottom side 180 of this workpiece support 102 is only one single clamping bolt 104, and associated with this clamping bolt 104 is an anti-rotation element 110, which may be configured, e.g., as a threaded pin 212 that is rotated into a threaded blind hole 214 on the bottom side 180 of the basic body 174 of the workpiece support 102 (see FIG. 23).

The longitudinal central axis 216 of the anti-rotation element 210 is offset relative to the longitudinal central axis 218 of the respectively associated clamping bolt 104 in a direction of offset 220, which is preferably oriented in parallel to an edge of the basic body 174 of the workpiece support 102, particularly preferably in parallel to an edge of the workpiece support face 178 of the workpiece support.

The distance s between the longitudinal central axis 216 of the anti-rotation element 210 and the longitudinal central axis 218 of the clamping bolt 104 corresponds to the distance of the midpoint 222 of a cover plate through-opening 112 from the central axis 224 of an anti-rotation groove 206 adjacent to the respective cover plate through-opening 112. It is hereby ensured that the workpiece support 102 can be placed on the (profiled) top side 114 of the cover plate 110 of the base unit 100 such that the clamping bolt 104 of the workpiece support 102 is accommodated centered in one of the cover plate through-openings 112 and the anti-rotation element 210 simultaneously engages into one of the anti-rotation grooves 206 adjacent to the respective cover plate through-opening 112.

Because the direction of offset 220, along which the anti-rotation element 210 is offset relative to the clamping bolt 104, is parallel to an edge of the basic body 174 of the workpiece support 102, it is hereby ensured that the edges of the cuboidal basic body 174 of the workpiece support 102 are all oriented in parallel to one of the anti-rotation grooves 206 and thus all in parallel to the movement direction 150 or in parallel to the transverse direction 166 of the base unit 100.

Unlike in the first embodiment depicted in FIGS. 1 to 17 of a combination of a base unit 100 and a plurality of workpiece supports 102, in the second embodiment depicted in FIGS. 18 to 23 of such a combination only one clamping bolt 104 and one anti-rotation element 210 is required for the anti-rotation protection of each workpiece support 102 relative to the cover plate 110 of the base unit 100, while in the first embodiment at least two clamping bolts 104 have to be present on each workpiece support 102 for an anti-rotation protection.

In the second embodiment, the number of clamping bolts 104 required for a positionally exact and anti-rotational arrangement of the workpiece supports 102 on the base unit 100 is therefore significantly reduced.

In all other respects, the second embodiment depicted in FIGS. 18 to 23 of a combination a base plate 100 and a plurality of workpiece supports 102 corresponds with respect to structure, function, and production method with the first embodiment depicted in FIGS. 1 to 17, to the preceding description of which reference is made in this regard.

The invention claimed is:

1. A base unit for releasably fixing workpiece supports, wherein each of the workpiece supports comprise at least one clamping bolt, wherein
the base unit comprises the following:
a base plate;
a cover plate, which is provided with cover plate through-openings through each of which one clamping bolt of the at least one clamping bolts of one workpiece support of the workpiece supports can pass;

a fixing element, which is provided with fixing element through-openings through each of which the one clamping bolt of the one workpiece support can pass, and by which the one clamping bolt of the one workpiece support is fixable to the base unit when the fixing element is located in a working position; and a movement device for moving the fixing element at least one of i) from a rest position into the working position and ii) from the working position into the rest position, wherein the fixing element comprises resiliently held clamping frames on each of which at least one of the fixing element through-openings is arranged and wherein each of the clamping frames is held on a basic body of the fixing element by one or more resiliently elastic arms.

2. The base unit in accordance with claim 1, wherein the fixing element through-openings each comprise a chamfer or each comprise a rim region with a smaller radius of curvature and a rim region with a greater radius of curvature.

3. The base unit in accordance with claim 1, wherein the fixing element is produced from a flat starting material and the fixing element through-openings are separated out of the flat starting material.

4. The base unit in accordance with claim 1, wherein midpoints of the cover plate through-openings are arranged at grid points of a regular grid.

5. The base unit in accordance with claim 1, wherein the one clamping bolt of the one workpiece support is centerable by each of the cover plate through-openings when the one clamping bolt extends through a respective cover plate through-opening of the cover plate through-openings.

6. The base unit in accordance with claim 1, wherein the movement device comprises a mechanical, pneumatic, hydraulic, or electric drive for the movement of the fixing element at least one of i) from the rest position into the working position and ii) from the working position into the rest position.

7. The base unit in accordance with claim 1, wherein the movement device comprises a screw with a head that is stationarily mounted in an axial direction of the screw relative to at least one of the cover plate and the base plate of the base unit.

8. The base unit in accordance with claim 1, wherein the movement device comprises a driver, which is coupled to the fixing element and is in engagement with a drive element of the movement device, wherein the driver preferably comprises a thread.

9. The base unit in accordance with claim 1, wherein the base unit comprises an elastically deformable pressing element for pressing the fixing element against the cover plate.

10. The base unit in accordance with claim 1, wherein the base plate comprises recesses or base plate through-openings for each accommodating the one clamping bolt of the one workpiece support.

11. The base unit in accordance with claim 1, wherein the base unit comprises at least one fixing clamping bolt for releasably fixing the base unit to a supporting base or to a clamping device.

12. A combination of a base unit for releasably fixing workpiece supports, wherein each of the workpiece supports comprise at least one clamping bolt, and at least one of the workpiece supports comprising one clamping bolt of the at least one clamping bolts, the base unit comprising the following:

a base plate;

a cover plate, which is provided with cover plate through-openings through each of which one clamping bolt of the at least one clamping bolts of one workpiece support of the workpiece supports can pass;

a fixing element, which is provided with fixing element through-openings through each of which the one clamping bolt of the one workpiece support can pass, and by which the one clamping bolt of the one workpiece support is fixable to the base unit when the fixing element is located in a working position; and a movement device for moving the fixing element at least one of i) from a rest position into the working position and ii) from the working position into the rest position, wherein the fixing element comprises resiliently held clamping frames on each of which at least one of the fixing element through-openings is arranged and wherein each of the clamping frames is held on a basic body of the fixing element by one or more resiliently elastic arms.

13. The combination in accordance with claim 12, wherein the combination comprises a plurality of the workpiece supports, which are releasably fixable to the base unit in such a way that the plurality of workpiece supports together form an uninterrupted total workpiece support face or a total workpiece support face that is interrupted only by narrow gaps.

14. The combination in accordance with claim 12, wherein at least one of the workpiece supports comprises an anti-rotation element.

15. A base unit for releasably fixing workpiece supports, wherein each of the workpiece supports comprise at least one clamping bolt, wherein the base unit comprises the following:

a base plate;

a cover plate, which is provided with cover plate through-openings through each of which one clamping bolt of the at least one clamping bolts of one workpiece support of the workpiece supports can pass;

a fixing element, which is provided with fixing element through-openings through each of which the one clamping bolt of the one workpiece support can pass, and by which the one clamping bolt of the one workpiece support is fixable to the base unit when the fixing element is located in a working position; and a movement device for moving the fixing element at least one of i) from a rest position into the working position and ii) from the working position into the rest position, wherein the movement devices comprises a screw with a head that is stationarily mounted in an axial direction of the screw relative to at least one of the cover plate and the base plate of the base unit.

16. A base unit for releasably fixing workpiece supports, wherein each of the workpiece supports comprise at least one clamping bolt, wherein the base unit comprises the following:

a base plate;

a cover plate, which is provided with cover plate through-openings through each of which one clamping bolt of the at least one clamping bolts of one workpiece support of the workpiece supports can pass;

a fixing element, which is provided with fixing element through-openings through each of which the one clamping bolt of the one workpiece support can pass, and by which the one clamping bolt of the one workpiece support is fixable to the base unit when the fixing element is located in a working position; and a movement device for moving the fixing element at least one of i) from a rest position into the working position and ii) from the working position into the rest position,
wherein the base unit comprises an elastically deformable pressing element for pressing the fixing element against the cover plate.

* * * * *